(12) United States Patent
Wu et al.

(10) Patent No.: US 11,054,516 B2
(45) Date of Patent: Jul. 6, 2021

(54) EXTENDED DOPPLER FMCW CODE DIVISION MIMO RADAR

(71) Applicant: NXP USA, Inc., Austin, TX (US)

(72) Inventors: Ryan Haoyun Wu, San Jose, CA (US); Chunshu Li, Davis, CA (US); Arunesh Roy, San Jose, CA (US)

(73) Assignee: NXP USA, INC., Austin, TX (US)

( * ) Notice: Subject to any disclaimer, the term of this patent is extended or adjusted under 35 U.S.C. 154(b) by 310 days.

(21) Appl. No.: 16/223,881

(22) Filed: Dec. 18, 2018

(65) Prior Publication Data

US 2020/0191939 A1 Jun. 18, 2020

(51) Int. Cl.
*G01S 13/58* (2006.01)
*G01S 7/292* (2006.01)
(Continued)

(52) U.S. Cl.
CPC ........... *G01S 13/582* (2013.01); *G01S 7/292* (2013.01); *G01S 13/878* (2013.01);
(Continued)

(58) Field of Classification Search
CPC .... G01S 13/931; G01S 13/325; G01S 13/343; G01S 13/42; G01S 7/023; G01S 13/003; G01S 13/878; G01S 13/284; G01S 13/2013; G01S 13/93271; G01S 7/352; G01S 13/584; G01S 7/292; H04B 7/0413;
(Continued)

(56) References Cited

U.S. PATENT DOCUMENTS 5,525,990 A * 6/1996 Lewis ................... G01S 7/2813
342/374
5,832,028 A 11/1998 Durrant et al.
(Continued)

FOREIGN PATENT DOCUMENTS

WO WO-2017187330 A1 * 11/2017 ............. G01S 7/023

OTHER PUBLICATIONS

XiZeng Dai, Jia Xu, Chunmao Ye, Ying-Ning Peng, "Low-sidelobe HRR profiling based on FDLFM-MIMO radar" 2007, 1st Asian and Pacific Conference on Synthetic Aperture Radar, IEEE, pp. 132-135 (Year: 2008).*
(Continued)

*Primary Examiner* — Olumide Ajibade Akonai

(57) ABSTRACT

Embodiments are provided for a radar system including: an N number of transmit antennas; a chirp generator configured to produce linear chirp waveforms; an N number of phase shift keying (PSK) coders, each assigned a respective optimized transmitter code of a set of optimized transmitter codes, each optimized transmitter code of the set comprises a sequence of K code chips, each optimized transmitter code of the set is orthogonal to every other optimized transmitter code of the set, spectral analysis of a cross-correlation between any two optimized transmitter codes results in sidelobes no greater than a predetermined detection threshold, each PSK coder encodes K linear chirp waveforms according to the sequence of K code chips of the respective optimized transmitter code and produces a respective optimized coded chirp sequence, and each of the N transmit antennas outputs the respective optimized coded chirp sequence at the same time.

20 Claims, 9 Drawing Sheets

(51) Int. Cl.
*G01S 13/87* (2006.01)
*H04B 7/0413* (2017.01)
*G01S 13/42* (2006.01)
*G01S 7/35* (2006.01)
*G01S 13/931* (2020.01)

(52) U.S. Cl.
CPC ............ *H04B 7/0413* (2013.01); *G01S 7/352* (2013.01); *G01S 13/42* (2013.01); *G01S 13/584* (2013.01); *G01S 13/931* (2013.01)

(58) Field of Classification Search
CPC ..... H04B 10/516; H04B 10/548; H04J 13/10; H04L 27/2626; H01Q 21/293
See application file for complete search history.

(56) References Cited

U.S. PATENT DOCUMENTS

| | | | |
|---|---|---|---|
| 5,867,119 | A | 2/1999 | Corrubia et al. |
| 9,448,302 | B2 | 9/2016 | Schoor et al. |
| 9,541,638 | B2 | 1/2017 | Jansen et al. |
| 9,547,071 | B2 | 1/2017 | Vaucher et al. |
| 9,689,967 | B1 | 6/2017 | Stark et al. |
| 9,791,564 | B1 | 10/2017 | Harris et al. |
| 9,933,520 | B1 * | 4/2018 | Campbell ............. G01S 13/343 |
| 2008/0143587 | A1 | 6/2008 | Johnson |
| 2009/0079617 | A1 | 3/2009 | Shirakawa et al. |
| 2013/0176166 | A1 | 7/2013 | Kishigami et al. |
| 2017/0160380 | A1 * | 6/2017 | Searcy ................. G01S 13/288 |
| 2017/0212213 | A1 | 7/2017 | Kishigami |
| 2017/0248686 | A1 * | 8/2017 | Zivkovic ................ G01S 13/42 |
| 2017/0254879 | A1 | 9/2017 | Tokieda et al. |
| 2018/0095163 | A1 | 4/2018 | Lovberg et al. |
| 2019/0101635 | A1 * | 4/2019 | Fukushima ........... G01S 13/904 |
| 2020/0011983 | A1 * | 1/2020 | Kageme ................ G01S 13/225 |
| 2020/0011985 | A1 | 1/2020 | Jenn et al. |
| 2020/0182991 | A1 * | 6/2020 | Hakobyan ............. G01S 13/343 |

OTHER PUBLICATIONS

Christian Sturm, Yoke Leen Sit, Gang Li, Hamid Afrasiabi Vayghan, Urs Lubbert ."Automotive Fast-Chip MIMO Radar with Simultaneous Transmission in a Doppler-Multiplex" Jun. 2018, 2018 19th International Radar Symposium, IEEE, pp. 1-6 (Year: 2018).*

Li et al., "MIMO Radar with Colocated Antennas, Review of Some Recent Work" IEEE Signal Processing Magazine, Sep. 2007, 9 pages.

Garcia, Oscar Faus, "Signal Processing for mmWave MIMO Radar," Master's Thesis in Electronics, University of Gavle, Jun. 2015, 259 pages.

Rao, Sandeep, of Texas Instruments, "MIMO Radar: Application Report, SWRA554," May 2017, 12 pages.

U.S. Appl. No. 16/224,050, filed Dec. 18, 2018, 58 pages.

Non-final office action dated Dec. 18, 2020 in U.S. Appl. No. 16/224,050.

Notice of Allowance dated May 3, 2021 in U.S. Appl. 16/224,050.

* cited by examiner

US 11,054,516 B2

EXTENDED DOPPLER FMCW CODE DIVISION MIMO RADAR

BACKGROUND

Field

This disclosure relates generally to automotive radar systems, and more specifically, to frequency-modulated continuous-wave (FMCW) code-division multiplexing (CD) multiple-input-multiple-output (MIMO) radar systems.

Related Art

In non-MIMO (multiple-input-multiple-output) radar systems, identical waveforms are transmitted at all transmitter channels of the radar system, each with a different amount of phase shift applied for focusing the transmission waveforms on a desirable look direction in the far field. This is referred to as transmit beamforming using an antenna array. In MIMO radar systems, no transmit beamforming is attempted. Instead, each transmitter channel transmits with a broad radiation pattern to illuminate the entire field of view (FOV) of the radar. The transmitted waveforms are also not identical, but are orthogonal to each other in either time, frequency, or code domain. At the receiver, signals originated from individual transmitter channels are then separated and the separated signals are processed to extract targets' range, Doppler speed (i.e., radial velocity), and direction of arrival (DoA) information.

A MIMO radar system includes multiple transmitting and receiving elements that form a virtually large antenna array aperture for detecting targets in antennas' FOV. For any MIMO radar, the signals transmitted by different transmitter channels are distinctly spreadable at any receiver channel as individual signals such that the resulting antenna array has an effective aperture equal to the convolution of the transmitting antenna array with the receiving antenna array. For an example MIMO radar with N transmitting antennas and M receiving antennas, a total of N×M virtual receiving elements can be constructed out of the N+M physical antennas. Each virtual receive element is effectively located at a position vector that is the sum of a paired transmit element and receive element position vectors. As a result, a large antenna array can be virtually formed with fewer physical elements to achieve better angle resolution. This characteristic of MIMO radar is of great value to automotive radars, which demands good angular resolution performance under stringent size, weight, power, and cost constraints. As a result, MIMO radar systems are often used in automotive radar applications that require high angle resolutions, especially with the 76~81 GHz millimeter wave automotive radar systems.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Multiple techniques exist for separating radar transmitter signals at a radar receiver, which is the key requirement of MIMO (multiple-input-multiple-output) radar systems. A MIMO radar system includes multiple transmitters (or transmitter channels) and multiple receivers (or receiver channels). Typical techniques include time division multiplexing (TD), frequency division multiplexing (FD), and code division multiplexing (CD) techniques. In TD MIMO, only one transmitter transmits at any given time so receivers can separate transmitter signals simply by knowing the time of transmission of each transmitter. In FD MIMO, transmitters transmit simultaneously but each transmits on a different and non-overlapping frequency band so receivers can separate transmitter signals simply by knowing the transmission frequency band of each transmitter. In CD MIMO, the transmitter signals are arranged in distinct coded sequences and the codes are orthogonal to each other so receivers can separate distinct transmitter signals by decoding with the known transmitter codes. Because of the orthogonal nature of the codes, each decoder can output only the signal encoded with a matching code and signals encoded with other codes are suppressed. The TD MIMO technique suffers from lower hardware utilization because only one transmitter is working at any given time so it is less efficient from the hardware utilization point of view. The FD MIMO suffers from lower spectrum efficiency because it requires multiple times of frequency bands to operate so it is less efficient from the spectrum utilization point of view. Of the three MIMO techniques, CD MIMO does not have any of these inefficiency issues and is considered the most efficient, making it a highly sought after solution. However, the trade-off in implementing a CD MIMO technique involves more complicated transceiver design for the orthogonal coding and decoding processes.

Figure 1:
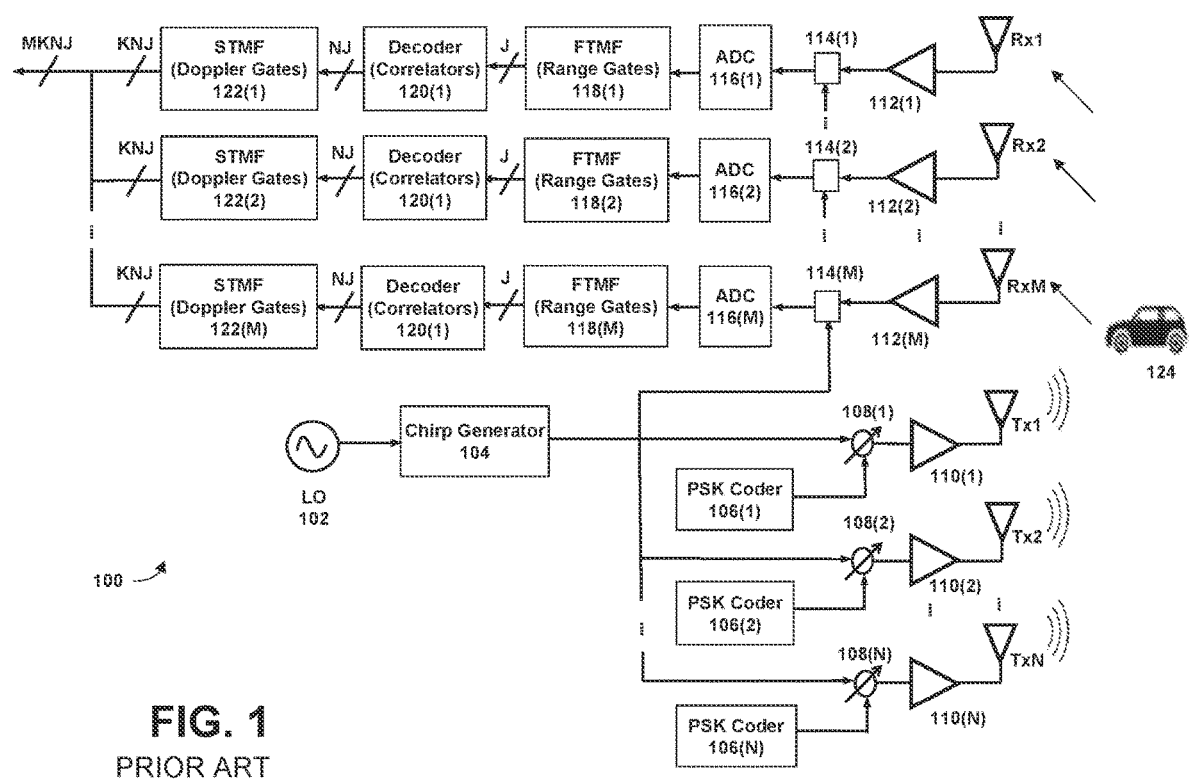
FIG. 1 is a block diagram depicting an example FMCW CD MIMO radar system implementing a conventional transmitter coding process, a conventional transmitter decoding process, and a conventional Doppler filtering process.

An example FMCW CD MIMO radar system 100 is shown in FIG. 1, which may implement a conventional transmitter coding and decoding scheme and a conventional Doppler filtering process, further discussed below. Radar system 100 includes a local oscillator (LO) 102, a chirp generator 104, phase shift keying (PSK) coders 106(1)-(N), mixers 108(1)-(N), power amplifiers 110(1)-(N), and transmit antennas Tx1-TxN that implement an N number of transmitters (or transmitter channels). Radar system 100 also includes receive antennas Rx1-RxM, low noise amplifiers (LNA) 112(1)-(M), mixer blocks 114(1)-(M), analog-to-digital converters (ADC) 116(1)-(M), fast time matched filters (FTMF) 118(1)-(M), decoders 120(1)-(M), and slow time matched filters (STMF) 122(1)-(M) that implement an M number of receivers (or receiver channels). These components are further discussed in detail below. Radar system 100 may also be referred to as a transceiver 100 including N transmitters and M receivers. During operation, the N transmitters drive encoded output signals on transmit antennas Tx1-TxN, which backscatters off an object in the range of radar system 100, such as vehicle 124, and echo signals are received on receive antennas Rx1-RxM. Since the echo signals are delayed in time as compared with the transmitter output signals, the radar system 100 generates signals indicating the relationships between the echo signals and the transmitter output signals, which may be processed by a functional evaluation circuit and provided to digital signal processing to determine information about the object, also referred to herein as the target.

The conventional transmitter coding process generates the transmitter output signals by encoding chirp waveforms according to a set of phase shift keying (PSK) transmitter codes. Each transmitter code is a sequence of code chips, where each transmitter code in the set has a same N' number of code chips, also referred to as code length N' of the transmitter code. Each transmitter code in the set of transmitter codes is orthogonal to the other codes in the set, and the code length N' is no shorter than the N number of transmitters. Each code chip has a value that corresponds to a phase shift, such as +1 for a phase shift of 0° and −1 for a phase shift of 180°. Each of the N transmitters is assigned a respective code, which is used to encode an N' number of chirp waveforms into a respective coded chirp sequence for the transmitter, with a total of N transmitter codes in the code set. Each transmitter transmits their respective coded chirp sequence at the same time for a repeated number of times, such as K times, for facilitating Doppler estimation. The K repeated coded chirp sequences forms the transmitter output signal, which is also referred to as a ranging waveform.

Assuming a chirp waveform has a length of Tr [sec], each respective coded chirp sequence has a length of N'*Tr [sec]. The interval of the repeated transmission of each coded chirp sequence is the pulse repetition interval or PRI, which is understood herein as the "chirp waveform repetition interval". The radar system of FIG. 1 can achieve a minimum PRI of N'*Tr, where the total transmission time of the ranging waveform including K repeated coded chirp sequences is K*N'*Tr [sec]. The length of PRI must be greater or equal to the chirp waveform's duration Tr to accommodate transmitter idle time between chirp waveforms in some systems. The repeated chirp waveforms allow range measurements to be produced over the multiple PRIs. Due to the relative movement between the radar and the target, the stability of the local oscillator, and the stationarity of the propagation channel, there exists a finite time during which a target's echo signal can be extracted coherently from a range-Doppler gate detection cell and an unambiguous determination of the target's range and Doppler speed can be made. The maximum time an echo signal of the target can be coherently processed within a detection cell is referred to as the detection cell dwell time (Tdwell), or dwell time in short.

Generally, during the dwell time, each receiver receives echo signals of the transmitters' ranging waveforms and processes the echo signal for information extraction. Each receiver includes FTMF 118, which implements J range gates that sorts the echo signals received by a given receiver into J range bins according to time of arrival relative to the transmitted ranging waveforms, where the different range bins correspond to different ranges in which the target may be located. Each receiver also includes a decoder 120 that implements J sets of N correlators, where each of the J range bin outputs are provided to a respective set of N correlators. Each of the N correlators is associated with a respective transmitter code of the code set, and the echo signal is cross-correlated with each of the N transmitter codes. Each of the N correlators outputs a correlation signal that has a peak when the echo signal was (most likely) encoded with a transmitter code that matches the correlator's associated transmitter code. As a result, the echo signal with matching transmitter code is decoded, and other signals (such as noise signals or signals encoded with a different transmitter code) are suppressed. Each receiver further includes STMF 122, which implements K Doppler gates that sorts the decoded echo signals into a K number of Doppler bins according to Doppler frequency shift or offset relative to the transmitted ranging waveforms, where the different Doppler bins correspond to different Doppler speeds at which the target may be traveling. The number of Doppler bins achievable by the radar system depends on the number of PRIs completed during the dwell time.

However, since the code length requirement for transmitter coding is dependent on the N number of transmitters in the radar system (and assuming dwell time on target is a fixed constraint), scaling up the N number of transmitters in a MIMO radar system consequently reduces the number of Doppler bins that can be constructed for transmitter decoding, which reduces the maximum unambiguous Doppler speed measurable by the system. In other words, the more transmitters that need to be encoded, the more limited the maximum speed the system can observe. In addition, because the transmitter decoding process assumes negligible Doppler effect within each encoded sequence, for the cases of fast moving targets or prolonged coded sequences, the phase rotation between chirp waveforms in one coded sequence due to Doppler shift becomes non-negligible and degradations occur due to phase-mismatches in the decoding correlators. The mismatch effect lowers the decoder correlation peak and causes higher decoder correlation sidelobes, resulting in poor separation of transmitters that degrades the performance of constructed of MIMO virtual aperture.

The present invention provides a FMCW CD MIMO radar system that implements an optimized transmitter coding process and a joint transmitter decoding and Doppler filtering process, which overcomes the issues discussed above by first choosing a set of transmitter codes having a code length equal to the number of Doppler bins allowable by the dwell time, that are orthogonal to each other, and whose cross-correlations are less periodic in nature; and secondly by weighting the Doppler gates using the complex conjugates of the orthogonal codes. The resulting combination filters are simultaneously tunable to transmitter code and Doppler shifts, making the decoders dedicated to the sole task of transmitter decoding in a conventional radar system unnecessary. The selection of orthogonal and low-periodic cross-correlation code is an important step for ensuring unambiguous decoding outputs. Many orthogonal codes are highly periodic in their cross correlations and such codes should be avoided.

In addition, because the phase rotation effect between chirp waveforms is accounted for in the joint transmitter decoding and Doppler filtering process, the phase-mismatch effect due to target movement is no longer a concern. As a result, when compared to conventional radar systems, the maximum unambiguous Doppler shift measurable by the system of present invention is extended by at least a factor equal to the number of transmitters. The decoder mismatches are also eliminated, resulting in better transmitter separation performance and thus better performance in constructed MIMO virtual apertures.

Example Embodiments

Figure 2:
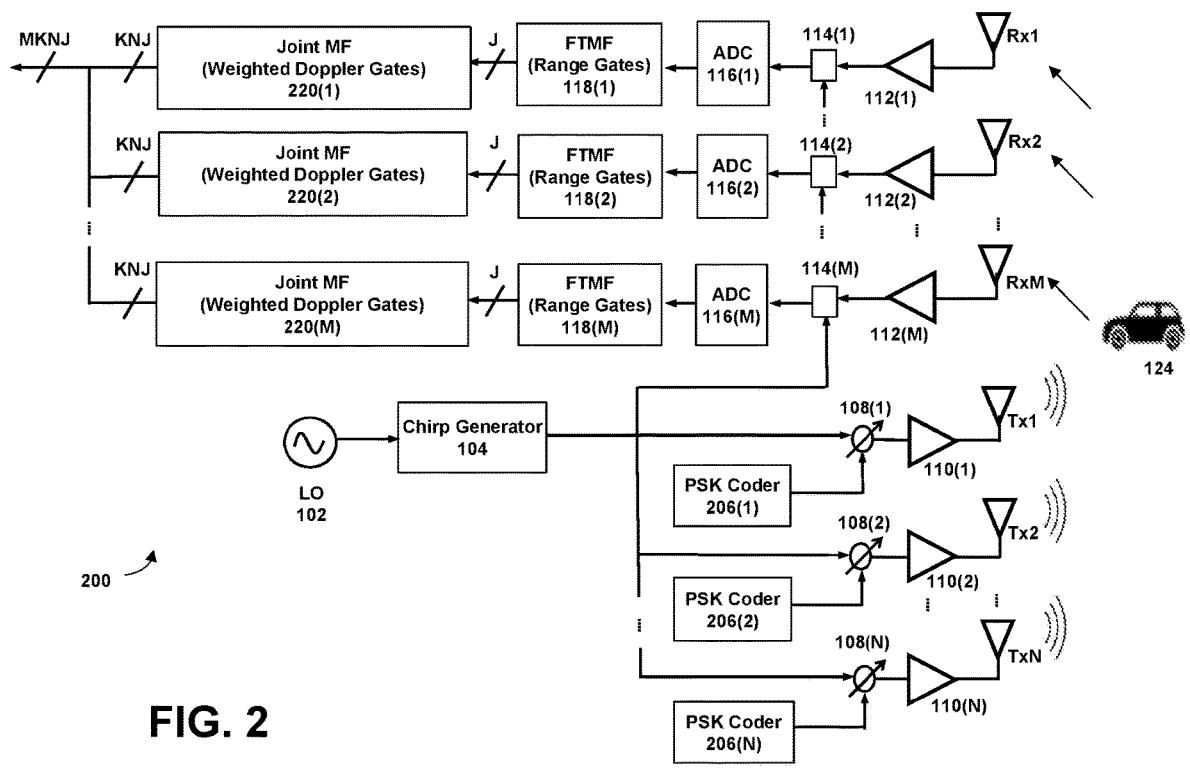
FIG. 2 is a block diagram depicting an example FMCW CD MIMO radar system implementing an optimized transmitter coding process, and a joint transmitter decoding and Doppler filtering process, according to some embodiments of the present disclosure.

FIG. 2 shows an example frequency modulated continuous wave (FMCW) code division (CD) multiple-input-multiple-output (MIMO) radar system 200 that implements an optimized transmitter coding and decoding scheme that uses an optimized code set and a joint transmitter decoding and Doppler filtering process, as further discussed below. Radar system 200 includes a local oscillator (LO) 102, a chirp generator 104, phase shift keying (PSK) coders 206(1)-(N), mixers 108(1)-(N), power amplifiers 110(1)-(N), and transmit antennas Tx1-TxN that implement N transmitters. Radar system 200 also includes receive antennas Rx1-RxM, low noise amplifiers 112(1)-(M), mixer blocks 114(1)-(M), analog-to-digital converters (ADC) 116(1)-(M), fast time matched filters (FTMF) 118(1)-(M), and joint transmitter decoding and Doppler filters 220(1)-(M) that implement M receivers. Radar system 200 may also be referred to as a radar transceiver 200 including N transmitters and M receivers. These components are further discussed in detail below. Elements having the same reference numbers in FIG. 1 and FIG. 2 indicate a same component that implements a same function. Transmitters and their associated transmit antennas may both be identified by TxN, such as Tx1 or Tx2. Receivers and their associated receive antennas may both be identified by RxM, such as Rx1 or Rx2. Also, it is noted that M, K, N, and J (used below) are integers greater than 1.

Figure 3:
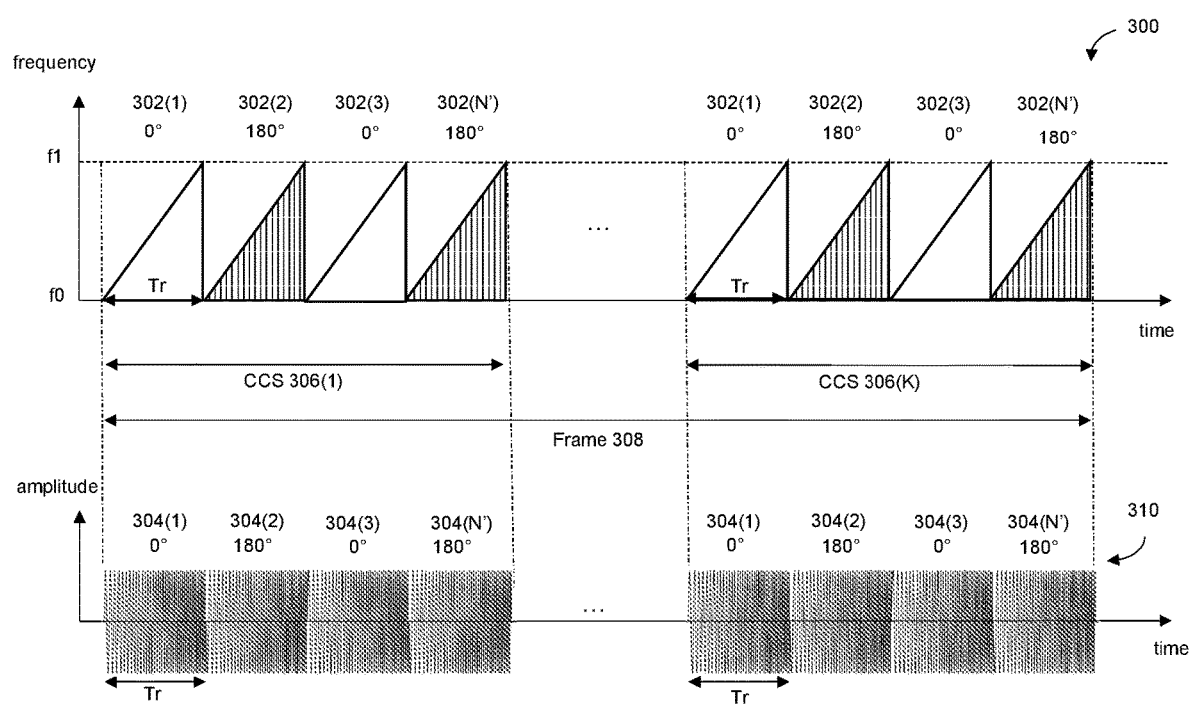
FIG. 3 shows waveforms of an example ranging waveform in the frequency and amplitude domains according to a conventional code set.

In both FIG. 1 and FIG. 2, on the transmitter side, LO 102 generates a sinusoidal signal at a carrier frequency, which is provided to the chirp generator 104. The chirp generator 104 modulates the carrier frequency with a baseband waveform, which has a limited bandwidth in the spectral domain. The resulting waveform is referred to as a chirp ranging waveform, or simply as a chirp waveform or a chirp, an example of which is shown in a frequency domain waveform 300 and corresponding amplitude domain waveform 310 in FIG. 3. A chirp is a sinusoidal RF (radio frequency) signal 304(1) having an instantaneous frequency 302(1) that linearly increases or decreases over time in a periodic manner, where the change in frequency provides periodic cycles used for time reference. In other words, the chirp is a frequency modulated continuous wave (FMCW) RF signal whose frequency varies as a function of time, usually in a linear fashion at a fixed varying rate. For example, as shown in FIG. 3, at the start of the chirp 302(1), the instantaneous frequency is f0 [Hz], and over the chirp's duration Tr [sec], the chirp's instantaneous frequency linearly shifts to f1 [Hz], where the rate of the shifting is (f1−f0)/Tr [Hz/sec], which is why these types of chirps are also referred to as linear chirp waveforms. The chirp waveform is repeatedly transmitted for multiple times to estimate Doppler shift of the carrier frequency reflected by the target.

In both FIG. 1 and FIG. 2, each of the N transmitters has a phase shift keying (PSK) coder that is configured to implement a code set of preselected orthogonal transmitter code. The PSK coders 106 in FIG. 1 use a conventional transmitter code set having code length N', and the PSK coders 206 in FIG. 2 use an optimized transmitter code set having code length K, which are further discussed below under the heading Transmitter Coding. The chirp waveforms 302 output by chirp generator 104 are encoded in accordance with the respective code set at mixer 108, and the resulting RF waveform is referred to as a coded chirp sequence (CCS). PSK coders 106 in FIG. 1 are configured to encode a CCS having N' chirps, where CCS is repeated K times to produce a ranging waveform, as further discussed below. PSK coders 206 in FIG. 2 are configured to encode an optimized CCS having K chirps, where a single optimized CCS forms a ranging waveform. The appropriate ranging waveform (the K repeated CCS in FIG. 1, or the optimized CCS in FIG. 2) is provided to PA 110, which drives the ranging waveform on the corresponding transmit antenna Tx. Each transmitter is associated with a respective ranging waveform, which are transmitted simultaneously (illustrated as concentric waves coming off of the transmit antennas), illuminating the targets in the FOV of the radar system, such as vehicle 124. The echo signals (or reflected ranging waveforms) from a target in the radar system's FOV then arrive at all receivers and are processed, as discussed below.

In both FIG. 1 and FIG. 2, for each of the M receivers, an echo signal is received on a respective receive antenna Rx (shown as an arrow received at the receive antennas, which may have bounced off of the vehicle 124) and is passed through LNA 112. The echo signal is then downmixed by block 114. In some embodiments, block 114 includes a mixer that downmixes the echo signal with the output of the chirp waveform generator 104 (e.g., uses chirps to downmix the echo signal). In some embodiments, block 114 also includes a low-pass filter. In other embodiments, block 114 includes a mixer that downmixes the echo signal with an output of the local oscillator 102 (instead of chirp generator 104), which down-converts the echo signal from the RF domain to an intermediate frequency (IF) domain. However, it is beneficial to downmix the echo signal with the output of the chirp waveform generator 104 because it provides lower or relaxed requirements for the ADC, which provides a cost benefit.

The downmixed echo signal is then sampled by ADC 116, which outputs a digital signal. The time delay of the echo signal is converted into a sinusoidal tone (e.g., the echo signal's time of arrival compared to the transmitted ranging waveform is translated into a range frequency) at the ADC 116 output. It is noted that the echo signal may take various forms after being processed by each functional block of the receiver, but the various forms are still referred to herein as the "echo signal" because each form continues to correspond to the echo signal. The echo signal includes the transmitter code used to encode the original ranging waveform that originated the echo signal.

Each receiver also includes a fast time matched filter (FTMF) 118 that detects the target's range by spectral analysis of the ADC 116 output. Each FTMF 118 basically implements a bank of J discrete Fourier transform (DFT) filters or Fast Fourier Transform (FFT) filters. Each of the J filters are tuned to a distinct set of range frequencies of interest, or range bins, which correspond to distinct frequency components of the mixer output signal. The J filters act as range gates that sort the echo signals into the various range bins while suppressing noise signals outside of the frequencies of interest. As a result, each FTMF 118 has a J number of outputs. The natural resolution of the estimated range corresponds to one over the waveform bandwidth and the maximum measurable unambiguous range is proportional to the length of the waveform.

In FIG. 1, the J outputs of each FTMF 118 are provided to a respective decoder 120 in each receiver to decode the echo signals. Each decoder 120 includes J sets of N correlators, one set for each of the J range bins. As a result, each decoder 120 provides an N*J number of outputs. In each set, each of the N correlators is associated with a respective conventional transmitter code having length N' (which is no smaller than N). Each of the N correlators is configured to cross-correlate an echo signal with the correlator's associated transmitter code to detect whether the echo signal includes the associated transmitter code, effectively checking the echo signal against every transmitter code used for coding at the N transmitters. Each correlator outputs a correlation signal that indicates a probability that the correlator's associated transmitter code is detected in the echo signal (e.g., indicates a probability that the echo signal was encoded with the associated transmitter code). The correlation signal includes a peak greater than a detection threshold when the echo signal's transmitter code matches the correlator's associated transmitter code, while the correlation signal remains below the detection threshold for non-matches. Because of the orthogonal nature of the transmitter codes, each decoder 120 only outputs a correlation signal associated with the echo signal including the matching transmitter code, while other signals are suppressed.

Further in FIG. 1, the N*J outputs of each decoder 120 are provided to a respective slow time matched filter (STMF) 122 in each receiver. It is noted that at any given range gate output of FTMF 118, if a target is present, a phase rotation corresponding to the radial velocity of the reflecting target will be present in the filter's outputs. Hence, the spectral domain information observed from multiple PRIs (usually referred to as the slow time domain) contains the target's radial velocity information. Each STMF 122 implements a bank of K filters, each of the K filters tuned to a distinct Doppler shift of the carrier frequency reflected by the target, which are used for extracting the target's radial velocity information. For example, each STMF 122 usually include a bank of K Fast Fourier transform (FFT) filters that act as Doppler gates that sort the echo signals into various Doppler bins. The Doppler shift measured from the slow-time domain processing has a measurable unambiguous frequency ranging between $-0.5/\text{PRI}$ and $+0.5/\text{PRI}$ [Hz], where PRI is equal to N'*Tr. Translated to radial velocity, the measurable unambiguous radial velocity ranges between $-0.5*C/(\text{PRI}*\text{fc})$ and $+0.5*C/(\text{PRI}*\text{fc})$ [m/s], where C is the speed of light and fc is the carrier frequency. The resolution of the Doppler measurement is determined by the number of PRI's transmitted and it is equal to $1/(K*\text{PRI})$ [Hz] (or equivalently $1/(K*N'*Tr)$ [Hz]) where K is the number of PRIs. Translated to radial velocity, it has a resolution of $C/(K*\text{PRI}*\text{fc})$ [m/s] (or equivalently $C/(K*N'*Tr*\text{fc})$ [m/s]). Each STMF 122 has a K*N*J number of outputs, where a total number of M*K*N*J outputs are produced over the M receivers.

Figure 9:
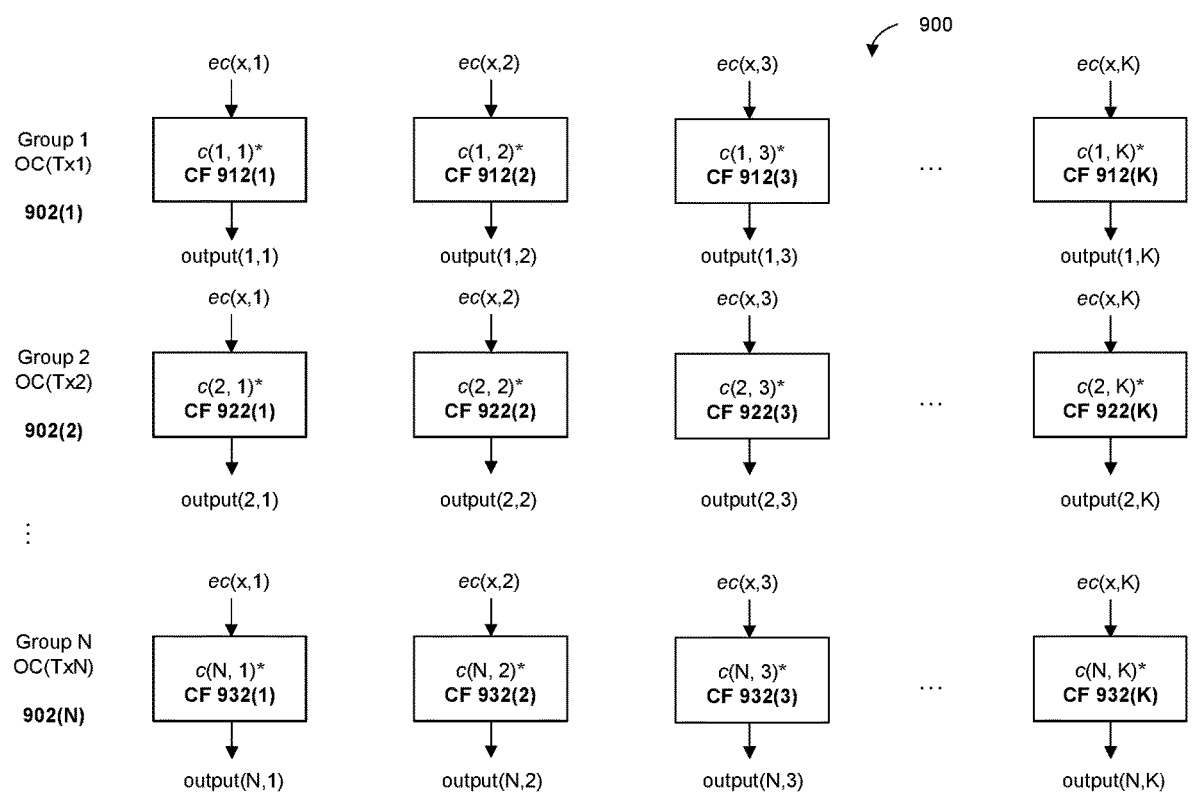
FIG. 9 is a block diagram depicting an example joint matched filter used for joint transmitter decoding and Doppler filtering in the radar system of FIG. 2, according to some embodiments of the present disclosure.

By contrast, FIG. 2 does not have decoders 120(1)-(M) and STMF 122(1)-(M), but the receivers instead include joint matched filter (MF) 220(1)-(M) that implement the joint transmitter decoding and Doppler filtering process. Picking up at FTMF 118 output on the receiver end, the J outputs of each FTMF 118 are provided to a respective joint MF 220, where each joint MF 220 includes a bank of K*N combination filters for each J range bin output. FIG. 9 shows an example joint matched filter 220 that includes a bank 900 of K*N combination filters for a J range bin, where the bank 900 is repeated for each J range bin. The combination filters may be grouped into an N number of groups 902 that correspond to the N transmitters, where each group includes K combination filters (CF), such as group 902(1) including CF 912(1)-(K), group 902(2) including CF 922(1)-(K), and group 902(N) including CF 932(1)-(K). Each of the K combination filters in a given group (also referred to as Doppler filters) are tuned to a distinct Doppler shift of the carrier frequency reflected by the target, acting as Doppler gates configured to sort the echo signals into a K number of Doppler bins according to differing Doppler shifts. The K*N combination filters may be implemented by a bank of K*N FFT filters, each tuned to a distinct Doppler shift of the carrier frequency reflected by the target.

Simultaneously, the echo signals may be decoded by the K*N combination filters. Each of the N groups of combination filters is also associated with a respective optimized transmitter code having length K (shown as OC(Tx1) for transmitter Tx1's optimized transmitter code, OC(Tx2) for transmitter Tx2's optimized transmitter code, and OC(TxN) for transmitter TxN's optimized transmitter code), where the optimized transmitter code is a sequence of K code chips. Each of the N groups includes K combination filters, where each of the K combination filters is associated with a respective code chip of the associated optimized transmitter code (e.g., a one-to-one correspondence between the K combination filters and the K code chips). Each of the K*N combination filters are weighted using the complex conjugate of the associated code chip (e.g., $c(1,1)^*$, where the asterisk * indicates the complex conjugate of the code chip), where a code chip of the echo signal is multiplied by the complex conjugate of the associated code chip (e.g., $ec(x,1)$, where x indicates the transmitter code used to encode the echo signal's original coded chirp sequence is as yet unknown), as further discussed below.

A complex conjugate of a complex number has a real part equal to the complex number's real part, and an imaginary part equal in magnitude to the complex number's imaginary part but opposite in sign (e.g., $x+iy$ has complex conjugate $x-iy$). Multiplying a code chip with the complex conjugate of the same code chip results in a non-negative real number, which can be used to provide a large correlation signal that indicates the code chip of the echo signal matches the combination filter's associated code chip. Each of the K*N combination filters output a correlation signal (e.g., output (1,1) as shown) that has a peak when the echo signal's code chip is multiplied by the complex conjugate of a matching code chip (e.g., a portion of the echo signal was (most likely) encoded with a transmitter code chip that matches the combination filter's associated transmitter code chip). Within each group, the combination of correlation signals by the K combination filters (e.g., the sum of all outputs (1,1)-(1,K) for the first group) provides a peak greater than a detection threshold when the echo signal's transmitter code matches the associated optimized transmitter code (or when the entirety of the sequence of code chips included in the echo signal matches the sequence of K code chips checked by the K combination filters), while non-matches remain below the detection threshold. As such, the N groups of K combination filters are configured to cross-correlate an echo signal with the associated optimized transmitter codes, effectively checking the echo signal against every transmitter code used for coding at the N transmitters.

As a result, each joint MF 220 is simultaneously tunable to optimized transmitter codes and Doppler shifts, without requiring a dedicated decoder. The Doppler shift measured from the slow-time domain processing has a measurable unambiguous frequency ranging between −0.5/PRI and +0.5/PRI [Hz], where PRI is equal to Tr. Translated to radial velocity, the measurable unambiguous radial velocity ranges between −0.5*C/(PRI*fc) and +0.5*C/(PRI*fc) [m/s], where C is the speed of light and fc is the carrier frequency. The resolution of the Doppler measurement is determined by the number of PRI's transmitted and it is equal to 1/(K*PRI) [Hz] (or equivalently 1/(K*Tr) [Hz]) where K is the number of PRIs. Translated to radial velocity, it has a resolution of C/(K*PRI*fc) [m/s] (or equivalently C/(K*Tr*fc) [m/s]). Each joint MF 220 has a K*N*J number of outputs, for a total number of M*K*N*J outputs produced over the M receivers.

The optimized transmitter codes are further discussed under the heading Transmitter Coding, and the joint decoding and Doppler filtering process implemented by joint MF 220(1)-(M) is further discussed under the heading Transmitter Decoding and Doppler Filtering. Information regarding the target may be obtained by evaluating the M*K*N*J outputs, as further discussed below in connection with FIG. 8.

Figure 8:
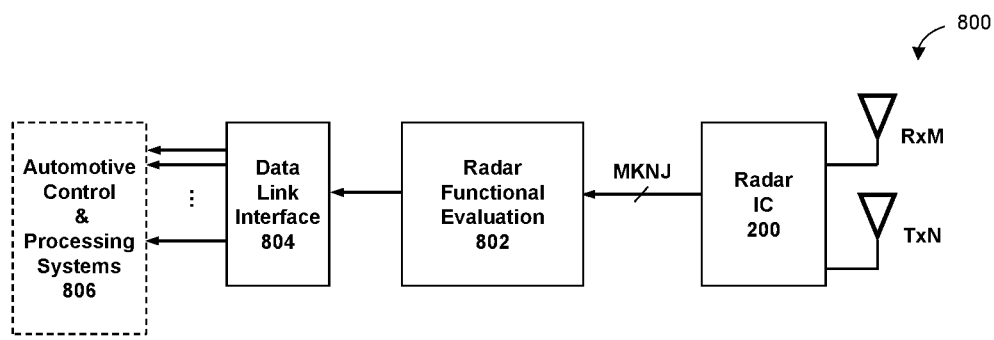
FIG. 8 is a block diagram depicting an example automotive system in which the radar system of FIG. 2 may be implemented, according to some embodiments of the present disclosure.

FIG. 8 shows an example automotive system 800 in which radar system 200 may be implemented, such as on a vehicle. In the embodiment shown, the radar system 200 may be implemented as an integrated circuit (IC), labeled radar IC 200, which may be formed as part of a semiconductor die or semiconductor substrate located within a vehicle. Radar IC 200 may be attached to an underlying carrier substrate such as a microcontroller board or PCB to form part of a radar device, where the carrier substrate includes electrically conductive features on a non-conductive substrate, formed using polyimide or FR4 or BT resin. The radar IC 200 includes the transceiver (e.g., transmitter and receiver) components discussed above in connection with FIG. 2. While the radar IC 200 is connected to the transmit antennas Tx1-TxN and receive antennas Rx1-RxM through transmission lines, the transmit antennas Tx1-TxN and receive antennas Rx1-RxM may be formed as part of the radar integrated circuit, or may be formed as a separate integrated circuit and attached to the microcontroller board, or may be formed as a separate device and attached to an exterior of the vehicle.

Automotive system 800 also includes radar functional evaluation circuit 802 configured to receive and process the outputs of radar transceiver 200 to detect the presence of a target and estimate the target's azimuth, or elevation angles, or both. The radar functional evaluation circuit 802 may also be configured to extract the target range, Doppler speed (or radial velocity), and direction of arrival (DoA) information. The results are tracked to further reduce noise and then classified. For example, radar functional evaluation circuit 802 may include functional blocks such as a detector, a DoA estimator, a tracker, and a classifier. The resulting list of detected targets in the range, radial velocity, and angle space, which is sometimes referred to as target plots, are then tracked (e.g., via Kalman filter based trackers) for further reducing detection errors and for condensing and clustering the information and classified to identify the types of targets. Radar functional evaluation circuit 802 may also be formed separately and attached to the microcontroller board.

The extracted target information (and optionally intermediate data, or the raw digitized signal samples, or both) is then sent to the data link interface 804 that is connected to other automotive control and processing systems 806 that may be located elsewhere in the vehicle, away from the microcontroller board. Examples of systems 806 include but are not limited to sensor fusion, control, and processing systems for safety monitoring, driver assistance, autonomous driving applications, and other applications. Typical data link interfaces include the Mobile Industry Processor Interface (MIPI), the Controller Area Network (CAN) bus, standard Local Area Network (LAN) interfaces, and Serializer-Deserializer (SerDes) interfaces and optical fiber links.

Radar functional evaluation circuit 802 may provide warning indications about the tracked objects to the automotive control and processing systems 806 through the data link interface 804. For example, an automotive processor may in turn communicate warnings about the tracked objects to the driver of the vehicle through visual displays, audio warning or chimes, and driver assistance (e.g., decelerating the vehicle or altering the course of the vehicle).

Transmitter Coding

To better illustrate the differences between using the conventional code set and the optimized code set, operation of PSK coders 106(1)-(N) of FIG. 1 is discussed herein.

In FIG. 1, PSK coders 106(1)-(N) are each configured to implement a conventional code set having a code length N' no shorter than the N number of transmit signals to be encoded (e.g., the minimum code length is equal to N), where the code length equals the number of code chips present in each transmitter code of the code set. The chirp waveform 302 is repeated an N' number of times, where the N' chirp waveforms are encoded in accordance with the N' code chips of the conventional code set at mixer 108, and the resulting waveform is referred to as coded chirp sequence (CCS) 306 (e.g., the number of chirps 302 in CCS 306 is equal to the code length N'). This coded chirp sequence 306 constitutes a single observation in the slow-time domain. Typical transmitter coding schemes are based on M-phase shift keying (M-PSK) technique (where M in M-PSK is unrelated to the M number of receivers), in which the integer value of M determines number of phase shift positions used for encoding the chirp waveforms. For the case of M equal 2, it is referred to as the binary-phase shift keying (BPSK) in which two phase shift positions, 0° and 180° (which are represented in phasor format as +1 and −1, respectively), are used for encoding transmitter waveforms. For example, to encode 4 transmitter waveforms, the following set of code based on length-N' (where N' equals 4) Hadamard code are commonly used.

$$C_1 = [c_{1,1} c_{1,2} c_{1,3} c_{1,4}] = [+1+1+1+1]$$

$$C_2 = [c_{2,1} c_{2,2} c_{2,3} c_{2,4}] = [+1-1+1-1]$$

$C_3 = [c_{3,1} c_{3,2} c_{3,3} c_{3,4}] = [+1+1-1-1]$ $C_4 = [c_{4,1} c_{4,2} c_{4,3} c_{4,4}] = [+1-1-1+1]$

Each transmitter code (for example, $C_1$) includes a sequence of 4 code chips (for example, c1,1, c1,2, c1,3, and c1,4) used for phase-modulating the chirp waveforms, where each transmitter code chip sequence is used for a respective transmitter, up to a maximum of 4 transmitters. For example, FIG. 3 illustrates an example coded chirp sequence CCS for transmitter Tx2, which is associated with the second transmitter code $C_2$. Referring to the second transmitter code $C_2$ above, the code chip c2,1, which is of the value of +1 in above example, means that a phase shift of 0° is applied to the first chirp 302(1) of transmitter Tx2 (i.e., no phase shift applied), shown as a clear triangle shaped waveform in FIG. 3. The code chip c2,2, which is of the value of −1, means that a phase shift of 180° is applied to the second chirp 302(2) of transmitter Tx2, shown as a shaded triangle shaped waveform in FIG. 3. CCS 306 is also repeated over time, such as K times, for facilitating Doppler estimation. As shown in FIG. 3, each CCS 306 includes a repeating pattern of N' chirp waveforms encoded according to the appropriate transmitter code chip sequence, where CCS 306 is repeated for K times to form a slow-time (Doppler) measurement frame 308, which has a duration equal to K*N'*Tr [sec] that is less than or equal to the detection cell dwell time (Tdwell).

By contrast, in FIG. 2, PSK coders 206(1)-(N) are each configured to implement an optimized coding scheme that uses an orthogonal transmitter code set that meets a selection or optimization criteria (listed below) and has a code length (or number of code chips) equal to the length of the Doppler filter (i.e., the number of Doppler filtering samples). For example, if a total of K chirps can be transmitted for estimating the Doppler shift of targets according to a maximum dwell time, the code length should be selected such that it is as close to K as possible, but no greater than K.

Each transmitter is assigned a distinct transmitter code from the optimized transmitter code set, which is implemented at the respective PSK coder 206 (components of the transmitter, such as the transmit antenna Tx or PSK coder may also be referred to as being assigned the distinct transmitter code). The distinct transmitter codes in the optimized transmitter code set must meet the following selection or optimization criteria:

1) Any transmitter code is orthogonal to any other transmitter code in a selected code set; and
2) The Fourier transform (e.g., the spectral analysis) of the cross-correlation between any two transmitter codes in a selected code set results in sidelobes no greater than a predetermined detection threshold.

The optimization criterion 1 ensures minimum leakage in the MIMO decoding process when transmitter signals are separated at the receivers. The optimization criterion 2 ensures a sufficient dynamic range for Doppler estimates which allows the detection of weak target (small radar cross section or RCS) in the presence of strong (large RCS) targets in the same range gate. The echo signal (which includes one of the optimized transmitter codes) is cross-correlated with each of the N optimized transmitter codes. Spectral analysis (such as a discrete Fourier transform) decomposes these cross-correlation signals into their component frequencies, referred to as a frequency response or spectrum, which is the frequency domain representation of the signal. The frequency spectrum includes a number of Doppler bins that are spaced apart by some frequency resolution (which is dependent on the sampling frequency implemented at the ADC 116), and each Doppler bin is associated with a frequency component magnitude. The frequency components of the cross-correlated signals are sorted into the Doppler bins, but some frequency components may not cleanly fall into a single Doppler bin, instead falling between two Doppler bins. Since the frequency response is discrete, the energy from the frequency component "leaks" out to any surrounding Doppler bins, appearing as sidelobes. The second criterion provides that such sidelobes are distinguishable from the main lobe to ensure transmitter separation by the sidelobes having a value no greater than the predetermined detection threshold, where the main lobe has a much larger value. For example, the predetermined detection threshold may be the square root of the code length (or $\sqrt{K}$), where a correlation signal having a (decoded) magnitude that is equal to or less than $\sqrt{K}$ may itself not be a detected peak. This $\sqrt{K}$ threshold value is based on summing over K received chirps correlated with a mismatched coded chirp sequence. Because the two coded chirp sequences are not matched, the sum of the cross correlation accumulates in a non-coherent fashion, leading to a mean magnitude of $\sqrt{K}$. On the other hand, when a transmitter code of an echo signal is cross-correlated with a matching transmitter code, the sum of the cross correlation accumulates in a coherent fashion, leading to a magnitude of K, which is higher than $\sqrt{K}$. Note that the conventional near-far problem of code-division multiple access (CDMA) systems does not apply in this situation because the targets of question are at the same distance from the radar.

Some popular orthogonal codes commonly used for MIMO transmitter coding, such as the Hadamard code, are perfectly orthogonal and will satisfy the first optimization criterion. But unfortunately, they fail the second criterion because severe sidelobes are present in the Fourier domain of their cross-correlations. Hence not all orthogonal codes are suitable for the present invention and careful selections of the joint transmitter and Doppler code is of paramount importance. The selection of orthogonal and low-periodic cross-correlation code is an important step for ensuring unambiguous decoding outputs. Many orthogonal codes are highly periodic in their cross-correlations and such codes should be avoided.

Figure 4:
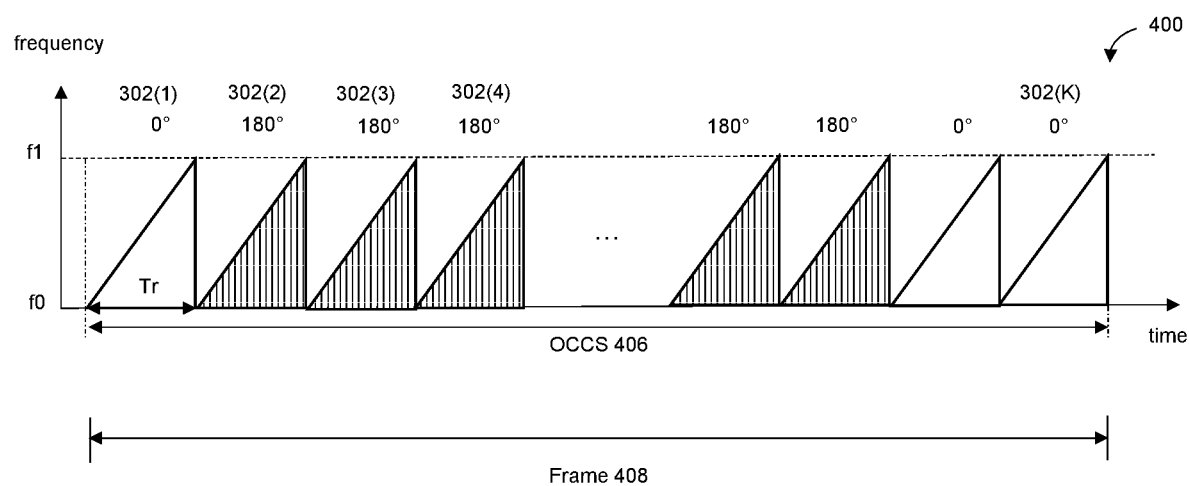
FIG. 4 shows a waveform of an example ranging waveform in the frequency domain according to an optimized code set, according to some embodiments of the present disclosure.

As shown in FIG. 4, the chirp waveform 302 is repeated a K number of times and phase shifted according to a length-K BPSK transmitter code. There is only one transmitter code chip sequence that is never repeated for the entire slow-time measurement frame within the dwell time. As shown in FIG. 4, chirps 302 are encoded in accordance with the length-K code set at mixer 108, and the resulting waveform is referred to as an optimized coded chirp sequence (OCCS) 406. The chirps 302 are encoded using an optimized transmitter code having code length K, such as $[+1-1-1-1 \ldots -1-1+1+1]$, where +1 code chips translate to a phase shift of 0 degrees applied to a respective chirp waveform and −1 code chips translate to a phase shift of 180 degrees applied to a respective chirp waveform. In other words, the number of chirp waveforms 302 in OCCS 406 is equal to the code length K. The K number of chirp waveforms form a slow-time (Doppler) measurement frame 408 (also referred to as Doppler frame 408) having a duration of K*Tr [sec], which is less than or equal to the dwell time. In this example, a single OCCS 406 including a K number of chirp waveforms 302 forms frame 408 (e.g., OCCS 406 is not repeated during the frame 408), where a K number of PRIs are completed during the frame 408, where the PRI is equal to Tr. For contrast, FIG. 3 shows a conventional CCS 306 including an N' number of chirp waveforms (such as 4 chirps), where CCS 306 is repeated a K number of times to form a frame 308 having a duration of K*N'*Tr, which completes a K number of PRIs during the frame 308, where the PRI is equal to N'*Tr (such as 4*Tr).

An example code set OC of optimized orthogonal transmitter code having code length K (where in this example K=128) that meets the optimization criteria is provided below, and is used in the Decoding Examples below. While 1s have been omitted, the plus sign ("+") indicates a code chip that applies a 0 degree phase shift and the minus sign ("−") indicates a code chip that applies a 180 degree phase shift:

$$OC_1 = \begin{bmatrix} c_{1,1} & c_{1,2} & c_{1,3} & c_{1,4} & \ldots & c_{1,K} \end{bmatrix} = [+−+−−−++−−−+++$$
$$+++−+++−+++−−+++\ldots+$$
$$−−+−+−−−+−−−+−+−++++−+−−+−$$
$$−\ldots−$$
$$−+−++++−+−++−+−−−+−−−−−+−++−−$$
$$−\ldots−$$
$$−−++−+−−++−+−+−+−−++−++−+−−+]$$

$$OC_2 = \begin{bmatrix} c_{2,1} & c_{2,2} & c_{2,3} & c_{2,4} & \ldots & c_{2,K} \end{bmatrix} = [+++++++++++−+−$$
$$+++−−−−+−−−+−+++−\ldots−−$$
$$−$$
$$−+++−++−+++−+++++−−+−−−−+$$
$$\ldots +$$
$$−+−++−−−+++−−+−+−+−+−+−−$$
$$+\ldots+$$
$$+−+++−+++++−+−+++−++−−−+−++−+−−]$$

$$OC_3 = \begin{bmatrix} c_{3,1} & c_{3,2} & c_{3,3} & c_{3,4} & \ldots & c_{3,K} \end{bmatrix} = [−+−++++−+−++−$$
$$++++−−+−+−+−++−+−+−$$
$$\ldots +$$
$$+−+++−+−−++−+−+−+−+−+++−−++−−+$$
$$+\ldots+$$
$$++++−++−+−−+++−++−−−−++−−−+−$$
$$−\ldots−$$
$$+−++−++−+−++−+−−++−+−−++−−+−$$
$$−]$$

Transmitter Decoding and Doppler Filtering

To better illustrate the differences between using the conventional decoding and the joint decoding and Doppler filtering, operation of FTMF 118(1)-(M), decoders 120(1)-(M), and STMF 122(1)-(M) of FIG. 1 are discussed herein.

In FIG. 1, at any given range gate output of FTMF 118, if a target is present, a phase rotation corresponding to the radial velocity of the reflecting target will be present in the filter's outputs. The signals from the N transmit antennas across the four code chips present the same relative phase relationship, as prescribed by the conventional transmitter code. The spectral domain information observed from multiple PRIs (usually referred to as the slow time domain) contains the target's radial velocity information, which is extracted by decoder 120. For example, assuming at the m-th receiver, at the j-th range gate's output of FTMF 118 (where m=1 . . . M and j=1 . . . J), a target has a complex amplitude A(n,m,j) if the waveform is not coded and only the n-th transmitter is transmitting (n=1 . . . N), the range gate's outputs from all transmitters at the receiver is:

$$x \equiv x_1 + x_2 + x_3 + x_4 = [A_{1,m,j} + A_{2,m,j} + A_{3,m,j} + A_{4,m,j},$$
$$A_{1,m,j} - A_{2,m,j} + A_{3,m,j} - A_{4,m,j}, \ldots \ldots A_{1,m,j} = A_{2,m,j} - A_{3,m,j} - A_{4,m,j},$$
$$A_{1,m,j} - A_{2,m,j} - A_{3,m,j} + A_{4,m,j}] = \begin{bmatrix} x_1 & x_2 & x_3 & x_4 \end{bmatrix}$$

where:

$$x_1 = [A_{1,m,j} c_{1,3} \quad A_{1,m,j} c_{1,2} \quad A_{1,m,j} c_{1,3} \quad A_{1,m,j} c_{1,4}] =$$
$$[A_{1,m,j} \quad A_{1,m,j} \quad A_{1,m,j} \quad A_{1,m,j}]$$
$$x_2 = [A_{2,m,j} c_{2,1} \quad A_{2,m,j} c_{2,2} \quad A_{2,m,j} c_{2,3} \quad A_{2,m,j} c_{2,4}] =$$
$$[A_{2,m,j} \quad -A_{2,m,j} \quad A_{2,m,j} \quad -A_{2,m,j}]$$
$$x_3 = [A_{3,m,j} c_{3,1} \quad A_{3,m,j} c_{3,2} \quad A_{3,m,j} c_{3,3} \quad A_{3,m,j} c_{3,4}] =$$
$$[A_{3,m,j} \quad A_{3,m,j} \quad -A_{3,m,j} \quad -A_{3,m,j}]$$
$$x_4 = [A_{4,m,j} c_{4,1} \quad A_{4,m,j} c_{4,2} \quad A_{4,m,j} c_{4,3} \quad A_{4,m,j} c_{4,4}] =$$
$$[A_{4,m,j} \quad -A_{4,m,j} \quad -A_{4,m,j} \quad A_{4,m,j}]$$

The target amplitude originated from the n-th transmitter is then extracted by conducting element-by-element multiplication of the code chip outputs with the complex conjugate of the corresponding transmitter code and then accumulated to obtain a summed output. For example, to extract the 4-th transmitter Tx4 target amplitude, decoder 120 performs the following computation:

$$\hat{A}_{4,m,j} = \begin{bmatrix} x_1 & x_2 & x_3 & x_4 \end{bmatrix} * conj\left(\begin{bmatrix} +1 \\ -1 \\ -1 \\ +1 \end{bmatrix}\right) = 4A_{4,m,j}$$

As shown in above example, the output from the multiply-and-accumulate operation extracts the correct target amplitude with an additional processing gain equal to the code length. The above example represents the output of the decoder 120 of the j-th range gate for one coded sequence, where decoder 120 has NJ outputs. As mentioned earlier, to measure Doppler shift, multiple code sequences must be transmitted and the outputs are collected and processed. FIG. 3 illustrates an example of a conventional coded chirp waveform sequence 306 (based on the second $C_2$ Hadamard code of the above example), which is repeated for K times to form a slow-time (Doppler) measurement frame 308.

Further, denote $\hat{A}_n[k]$ as the decoded target amplitude corresponding to the n-th transmitter's signal at the j-th range gate for the k-th coded sequence or slow-time sample, where k=1 . . . K. The Doppler shift of the target at the range gate illuminated by the n-th transmitter is then obtained by STMF 122 performing discrete Fourier transform (DFT) on the sample sequence $\hat{A}_n = [\hat{A}_n[1], \hat{A}_n[2], \ldots \hat{A}_n[K]]$. To extract a target signal at a Doppler shift value $f_D$ [Hz], the following DFT filtering computation is performed:

$$y_{n,m,j}(f_D) = \sum_{k=1}^{K} \hat{A}_n[k] e^{-j2\pi f_D(k-1)PRI} \text{ (note that } j = \sqrt{-1}, j \neq j\text{)}$$

In theory, the above DFT filtering can be conducted for arbitrary Doppler shift of interest. In practice, the bank of DFT filters is implemented using Fast Fourier Transform (FFT) for higher computation efficiency. The K FFT outputs of STMF 122 are denoted as $$y_{n,m,j} = [y_{n,m,j,1}, y_{n,m,j,2}, \cdots y_{n,m,j,K}]$$

in which $y_{n,m,j,k}$ is denoted as the k-th FFT or the k-th Doppler gate output, which corresponds to the output of a DFT filter tuned to a Doppler shift of $$f_{D,k} = \frac{k-1}{K * PRI}$$

The above $y_{n,m,j,k}$ denotes the m-th receiver's target amplitude matched filtered to the j-th range gate and the k-th Doppler gate and is illuminated by the n-th transmitter.

As noted above, the maximum time a target can be coherently processed within a detection cell is referred to as the detection cell dwell time ($T_{dwell}$), or dwell time in short. Because of the constraint of the fixed dwell time on the target, the requirement for transmitter coding consequently reduces the number of Doppler bins that can be constructed, which reduces the maximum unambiguous Doppler speed measurable by the system. For example, assuming a dwell time of 30 ms, for a 30μ-sec chirp (i.e., Tr=30e-6), up to 1000 (i.e. K=1000) chirps can be shared among the tasks of transmitter coding and Doppler estimation. For comparison, in the non-MIMO case, in which N is 1, minimum PRI is equal to the chirp length. The resulting maximum measurable unambiguous Doppler shift is ±16.6 KHz, or (assuming a carrier frequency of 78 GHz) equivalently a maximum measurable unambiguous radial velocity of ±64 m/s or ±230 km/hr, which is suitable for highway traffic. For the case of a MIMO radar, assuming there are 3 transmitters, typically 4 chirps will need to be allocated for transmitter coding. As a result, the maximum measurable unambiguous radial velocity is reduced by 4 times to ±57 km/hr. The reduction becomes more severe as more transmitters need to be coded. For example, for the case of 16 transmitters, the maximum measurable unambiguous radial velocity is reduced by 16 times to ±14 km/hr, which is limited for road use. The situation is worsened for system with high range resolution. The example of 30 ms dwell time assumes a range resolution of 1 m and a maximum radial speed of 120 km/hr. If the range resolution is 0.1 m, the dwell time is reduced to 3 ms and the maximum Doppler can be measured becomes ±1.4 km/hr and its usefulness is severely limited.

In addition, because the conventional transmitter decoding process assumes negligible Doppler effect within each encoded sequence, for the cases of fast moving targets or prolonged coded sequences, the phase rotation effect due to Doppler shift becomes non-negligible and degradations occur due to phase-mismatches in the decoding correlators. The mismatch effect lowers the decoder correlation peak and causes higher decoder correlation sidelobes, resulting in poor separation of transmitters which degrades the performance of constructed of MIMO virtual aperture.

Continuing the above example, $A_{n,m,j}$ is denoted as the complex target amplitude at the j-th range gate's output received by the m-th receiver from the illumination of the n-th transmitter, assuming there is no relative movement between the radar and the target, without any coding applied. Conventionally, a 4×4 Hadamard code may be used for encoding the chirp sequences of the transmitter, which is reproduced below:

$$C_1 = [c_{1,1} c_{1,2} c_{1,3} c_{1,4}] = [+1+1+1+1]$$

$$C_2 = [c_{2,1} c_{2,2} c_{2,3} c_{2,4}] = [+1-1+1-1]$$

$$C_3 = [c_{3,1} c_{3,2} c_{3,3} c_{3,4}] = [+1+1-1-1]$$

$$C_4 = [c_{4,1} c_{4,2} c_{4,3} c_{4,4}] = [+1-1-1+1]$$

The received coded chirp sequences at a receiver's j-th range gate output is (assuming no relative movement between the radar and target), which is also reproduced below:

$$x = [A_{1,m,j} + A_{2,m,j} + A_{3,m,j} + A_{4,m,j}, A_{1,m,j} - A_{2,m,j} + A_{3,m,j} - A_{4,m,j}, \ldots A_{1,m,j} + A_{2,m,j} - A_{3,m,j} - A_{4,m,j}, A_{1,m,j} - A_{2,m,j} - A_{3,m,j} + A_{4,m,j}]$$

If the radial velocity is not zero (i.e., there is relative movement between radar and target), the received coded sequence at range gate output becomes:

$$x(m) \cong [A_{1,m,j} + A_{2,m,j} + A_{3,m,j} + A_{4,m,j},$$
$$\ldots A_{1,m,j} e^{j2\pi f_D Tr} - A_{2,m,j} e^{j2\pi f_D Tr} + A_{3,m,j} e^{j2\pi f_D Tr} - A_{4,m,j} e^{j2\pi f_D Tr},$$
$$\ldots A_{1,m,j} e^{j4\pi f_D Tr} + A_{2,m,j} e^{j4\pi f_D Tr} - A_{3,m,j} e^{j4\pi f_D Tr} - A_{4,m,j} e^{j4\pi f_D Tr},$$
$$\ldots A_{1,m,j} e^{j6\pi f_D Tr} - A_{2,m,j} e^{j6\pi f_D Tr} - A_{3,m,j} e^{j6\pi f_D Tr} + A_{4,m,j} e^{j6\pi f_D Tr}]$$

where:

$$f_D = \frac{-2v_R * f_c}{C}$$

$v_R$ is the radial velocity in [m/s], and $f_c$ is the carrier frequency in [Hz] and C is the speed of light in [m/s], assuming the differences between the Doppler shift between n-m transmitter-receiver pairs are negligible.

To extract the target amplitude of the first transmitter Tx1, the decoder 120 performs the following computation:

$$\hat{A}_{1,m,j} = [x] * conj\left\{\begin{bmatrix} +1 \\ +1 \\ +1 \\ +1 \end{bmatrix}\right\} =$$

$$(A_{1,m,j} + A_{2,m,j} + A_{3,m,j} + A_{4,m,j}) * 1 + \ldots (A_{1,m,j} e^{j2\pi f_D Tr} - A_{2,m,j} e^{j2\pi f_D Tr} + A_{3,m,j} e^{j2\pi f_D Tr} - A_{4,m,j} e^{j2\pi f_D Tr}) * 1 +$$
$$\ldots (A_{1,m,j} e^{j4\pi f_D Tr} + A_{2,m,j} e^{j4\pi f_D Tr} - A_{3,m,j} e^{j4\pi f_D Tr} - A_{4,m,j} e^{j4\pi f_D Tr}) *$$
$$1 +$$
$$\ldots (A_{1,m,j} e^{j6\pi f_D Tr} - A_{2,m,j} e^{j6\pi f_D Tr} - A_{3,m,j} e^{j6\pi f_D Tr} + A_{4,m,j} e^{j6\pi f_D Tr}) *$$
$$1 = A_{1,m,j}(1 + e^{j2\pi f_D Tr} + e^{j4\pi f_D Tr} + e^{j6\pi f_D Tr}) +$$
$$\ldots A_{2,m,j}(1 - e^{j2\pi f_D Tr} + e^{j4\pi f_D Tr} - e^{j6\pi f_D Tr}) +$$
$$\ldots A_{3,m,j}(1 + e^{j2\pi f_D Tr} - e^{j4\pi f_D Tr} - e^{j6\pi f_D Tr}) +$$
$$\ldots A_{4,m,j}(1 - e^{j2\pi f_D Tr} - e^{j4\pi f_D Tr} + e^{j6\pi f_D Tr})$$

$$\begin{cases} = 4A_{1,m,j} & \text{if } f_D = 0 \text{ or } \mod(2\pi f_D Tr, 2\pi) = 0 \\ \cong 4A_{1,m,j} & \text{if } 2\pi f_D (N'-1) Tr \cong 0 \\ \neq 4A_{1,m,j} & \text{if else} \end{cases}$$

Using the above target amplitude computation for Tx1 for comparison, we can see that decoding the 4-th transmitter Tx4 will only be ideal if only the $A_{4,m,j}$ term remains and the rest of the $A_{1,m,j}$, $A_{2,m,j}$, and $A_{3,m,j}$ terms are zeros. We can also see that the ideal extraction will not be possible without $f_D=0$ or $\mod(f_D Tr, 2\pi)=0$ in general. As a result, for any moving target scene, the conventional decoding process cannot separate transmitter signals perfectly, resulting in leakage in the decoder outputs. As successful MIMO aperture construction requires separation of the transmitters' signals, the leakage results in degradation in the formed virtual aperture. The effect of such degradation is also random and worsens with increased relative speed of the targets. In practice, to ensure tolerable mismatching for the entire PRI, the code length and chirp duration are constrained (i.e. making sure $2\pi f_D(N'-1)Tr \cong 0$ such that $e^{j2\pi f_D Tr}$, $e^{j4\pi f_D Tr}$, and $e^{j6\pi f_D Tr} \cong 1$).

To address these problems, the present disclosure provides an optimized transmitter decoding process combined with the Doppler measurement process to resolve the reduced maximum unambiguous Doppler speed and decoder phase-mismatch problem in a moving scene. The joint transmitter decoding and Doppler filtering process of the present disclosure chooses a set of optimized transmitter codes that are orthogonal to each other and whose cross correlations are less periodic in nature, with a code length equal to the number of Doppler bins allowable by the dwell time (which were discussed above under the header Transmitter Coding). The combination Doppler filters are weighted using the complex conjugates of the orthogonal codes, making the combination filters simultaneously tunable to transmitter codes and Doppler shifts, which eliminates the need for decoders dedicated to the sole task of transmitter decoding.

In addition, because the phase rotation effect is accounted for in the joint transmitter decoding and Doppler filtering process, the mismatch effect due to target movement is no longer a concern. As a result, comparing to conventional coding and decoding schemes, the maximum unambiguous Doppler shift measurable by the system of present invention is extended by at least a factor equal to the number of transmitters and the decoder phase-mismatches are also eliminated, resulting in better transmitter separation performance and thus better performance in constructed MIMO virtual apertures.

Continuing the discussion with the aforementioned example in which each PRI includes 4 chirp waveforms that are coded with the conventional length-4 Hadamard code and repeated for K PRIs, denote $x(m, k)$ as the m-th receiver's j-th range gate's output for the k-th PRI, which contains the range gate's output for the four chirps of the k-th PRI. Assume in this case only 3 transmitters are transmitting, considering target's Doppler shift, $x(m, k)$ can be written in the following expression:

$$x(m,k)=[x_1,x_2,x_3,x_4]=[(A_{1,m,j}+A_{2,m,j}+A_{3,m,j})$$
$$e^{j2\pi f_D Tr}, \ldots (A_{1,m,j}-A_{2,m,j}+A_{3,m,j}))e^{j2\pi f_D Tr}, \ldots$$
$$(A_{1,m,j}+A_{2,m,j}-A_{3,m,j})e^{j4\pi f_D Tr}, \ldots (A_{1,m,j}-A_{2,m,j}-A_{3,m,j})e^{j6\pi f_D Tr}]*e^{j2\pi f_D(k-1)N'Tr}$$

In conventional decoding schemes, the received coded sequences $x(m, k)$ are first decoded by decoders 120, and then the outputs are Fourier transformed by STMF 122 to obtain the Doppler estimates. For example, decode each $x(m, k)$ using transmitter Tx1's code, the decoder output for the k-th PRI is $$\hat{A}_{1,m,j}=[k]=[x(m,k)]*conj\left\{\begin{bmatrix}+1\\+1\\+1\\+1\end{bmatrix}\right\}=$$

-continued
$$(A_{1,m,j}(1+e^{j2\pi f_D Tr}+e^{j4\pi f_D Tr}+e^{j6\pi f_D Tr})+$$
$$\ldots A_{2,m,j}(1-e^{j2\pi f_D Tr}+e^{j4\pi f_D Tr}-e^{j6\pi f_D Tr})+$$
$$\ldots A_{3,m,j}(1+e^{j2\pi f_D Tr}-e^{j4\pi f_D Tr}-e^{j6\pi f_D Tr}))*e^{j2\pi f_D(k-1)N'Tr}$$

(for $k=1 \ldots K$)

A discrete Doppler filter or gate that is matched to a Doppler shift $f_d$ [Hz] is computed based on the following expression:

$$\hat{y}_{1,m,j}(f_d)=\sum_{k=1}^{K}\hat{A}_{1,m,j}[k]e^{-j2\pi f_d(k-1)PRI}=$$
$$\sum_{k=1}^{K}\hat{A}_{1,m,j}[k]e^{-j2\pi f_d(k-1)N'Tr}=\sum_{k=1}^{K}e^{j2\pi f_D(k-1)N'Tr}*$$
$$e^{-j2\pi f_d(k-1)N'Tr}*\{A_{1,m,j}(1+e^{j2\pi f_D Tr}+e^{j4\pi f_D Tr}+e^{j6\pi f_D Tr})+$$
$$A_{2,m,j}(1-e^{j2\pi f_D Tr}+e^{j4\pi f_D Tr}-e^{j6\pi f_D Tr})+$$
$$A_{3,m,j}(1+e^{j2\pi f_D Tr}-e^{j4\pi f_D Tr}-e^{j6\pi f_D Tr})\}$$

By observing the above equation, it is can be seen that when $f_d=f_D$ (i.e., the Doppler filter's center frequency matches the target's actual Doppler frequency), the product of the first two terms is 1, because $$e^{j2\pi f_D(k-1)N'Tr}*e^{-j2\pi f_D(k-1)N'Tr}=e^0=1.$$

If $f_D$ is sufficiently small such that $$e^{j2\pi f_D Tr}\cong 1, e^{j4\pi f_D Tr}\cong 1, e^{j6\pi f_D Tr}\cong 1$$

are true, the matched DFT Doppler filter's output is maximized at K, because $$\hat{y}_{1,m,j}=\Sigma_{k=1}^{K}1=K.$$

In the present disclosure, the optimized transmitter decoding and Doppler filtering is jointly performed. Let $x(m, k)$ denote the m-th receiver's j-th range gate's output for the k-th PRI, which contains the range gate's output for a single chirp of the k-th PRI. The $x(m, k)$ for the case of 3 transmitters can be written as (for $k=1 \ldots K$):

$$x(m,k)=(A_{1,m,j}c_{1,k}+A_{2,m,j}c_{2,k}+A_{3,m,j}c_{3,k})*e^{j2\pi f_D(k-1)N'Tr}$$

with the optimized code set denoted below for the 3 transmitters:

$$OC_1=[c_{1,1}c_{1,2}\ldots c_{1,K}]$$
$$OC_2=[c_{2,1}c_{2,2}\ldots c_{2,K}]$$
$$OC_3=[c_{3,1}c_{3,2}\ldots c_{3,K}]$$

and when the codes are orthogonal to each other, then the following is true:

$$\sum_{k=1}^{K}c_{n',k}c_{n,k}^{*}=\begin{cases}K & \text{if } n'=n\\ \cong 0 & \text{if } n'\neq n\end{cases}$$

The joint transmitter decoding and Doppler filtering process is then conducted based on the following cross-correlation operations that 1) cross-correlate an echo signal with the N optimized transmitter codes (or N sequences of K code chips) used to encode the echo signal and 2) is weighted with the complex conjugate of the corresponding code chip of the optimized transmitter code (as indicated by the asterisk "*"), for decoding for an n-th transmitter and filtering for a Doppler shift of $f_d$ [Hz]:

$$\hat{y}_{n,m,j}(f_d) = \sum_{k=1}^{K} x(m,k)(c_{n,k})^* e^{-j2\pi f_d(k-1)PRI} =$$

$$\sum_{k=1}^{K} x(m,k)(c_{n,k})^* e^{-j2\pi f_d(k-1)N'Tr} = \sum_{k=1}^{K} e^{j2\pi f_D(k-1)N'Tr} * e^{-j2\pi f_d(k-1)N'Tr} *$$

$$(A_{1,m,j} c_{1,k} c_{n,k}^* + A_{2,m,j} c_{2,k} c_{n,k}^* + A_{3,m,j} c_{3,k} c_{n,k}^*) =$$

$$A_{1,m,j} \sum_{k=1}^{K} c_{1,k} c_{n,k}^* e^{j2\pi(f_D - f_d)(k-1)N'Tr} +$$

$$A_{2,m,j} \sum_{k=1}^{K} c_{2,k} c_{n,k}^* e^{j2\pi(f_D - f_d)(k-1)N'Tr} +$$

$$A_{3,m,j} \sum_{k=1}^{K} c_{3,k} c_{n,k}^* e^{j2\pi(f_D - f_d)(k-1)N'Tr}$$

Based on the expression above, it can be seen that when a combination filter is tuned to the correct Doppler frequency (i.e. $f_d = f_D$)

$$\hat{y}_{n,m,j}(f_d) =$$

$$A_{1,m,j} \sum_{k=1}^{K} c_{1,k} c_{n,k}^* + A_{2,m,j} \sum_{k=1}^{K} c_{2,k} c_{n,k}^* + A_{3,m,j} \sum_{k=1}^{K} c_{3,k} c_{n,k}^* = K A_{n,m,j}$$

the combination filter's output is maximized at $KA_{n,m,j}$. In other words, when the echo signal includes the optimized transmitter code that matches the transmitter code of the n-th transmitter, the combination filters output a maximum value or peak due to being weighted with the complex conjugates of the optimized transmitter code chips (where multiplication of a code chip and its complex conjugate results in a non-negative real number useful for generating large correlation peaks), effectively decoding the echo signal and determining the spectral peak simultaneously, assuming that the combination filter is tuned to the target's Doppler frequency.

When the combination filter is not tuned to the target's Doppler frequency, the outputs may not be zeros and the level of the residual depends on the periodicity of the codes' cross correlation, denoted as $$\rho_{n',n}[k] \equiv c_{n',k} c_{n,k}^*$$

If $\rho_{n',n}[k]$ has a periodicity matching with the combination filter's $f_D$-$f_d$ frequency, a large response will result. Because of this, it is important to find a set of code that has low cross-correlation periodicity.

For completeness' sake, returning to FIG. 8, the DoA estimator block included in radar functional evaluation circuit 802 may use the target amplitude for determining DoA estimation. For simplicity, further denote $y_{i,j,k}$ as the target amplitude corresponding to the i-th virtual receive element matched filtered to the j-th range gate and the k-th Doppler gate, where the i-th virtual receive element is mapped to an n-th transmitter and m-th receiver pair according to the MIMO principle where $n \in \{1 \ldots N\}$, $m \in \{1 \ldots M\}$, and $i \in \{1 \ldots NM\}$. The DoA estimation is then conducted for the j-th range gate and k-th Doppler gate output (assuming it is with a magnitude above a detection threshold, such as a Constant False-Alarm Rate or CFAR threshold) by processing the virtual array signals $y_{i,j,k}$ (where $i=1 \ldots N*M$) using standard deterministic or statistical beamforming approaches or other higher-resolution approach such as Multiple Signal Classification (MUSIC) and Estimation of Signal Parameters via Rotational Invariance Technique (ESPRIT).

It is also noted that the data refresh rate (e.g., at a DoA estimation block) for the conventional coding and decoding scheme discussed above in connection with FIG. 1 is equal to 1/(N'*Tr*K) [Hz]. By contrast, the data refresh rate for the optimized coding and decoding scheme discussed above in connection with FIG. 2 is equal to 1/(Tr*K) [Hz].

Decoding Examples

Figure 5A:
FIGS. 5A, 5B, and 5C are graphical representations of a ranging waveform encoded according to a conventional code set and processed by a conventional transmitter decoding process and a conventional Doppler filtering process.
Figure 5B:
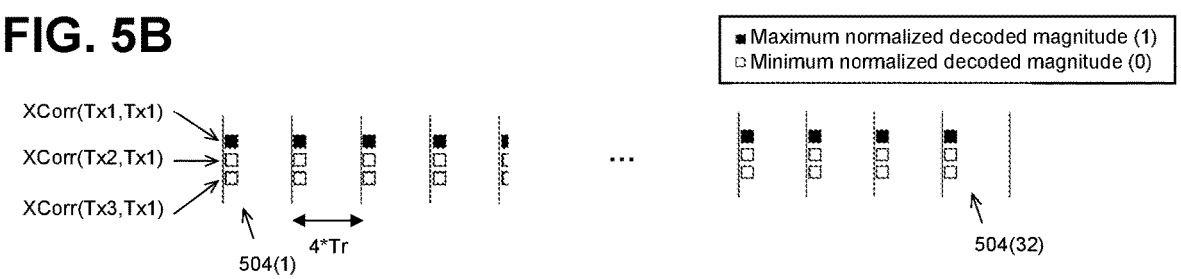
Figure 5C:
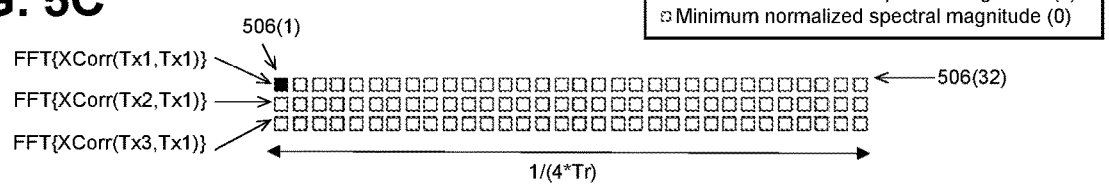

FIGS. 5A, 5B, and 5C show a conventional decoding process using a conventional length-4 Hadamard transmitter code set. FIGS. 6A, 6B, 6C, and 6D show a joint decoding and Doppler filtering process using an optimized transmitter code set. FIGS. 7A, 7B, and 7C show a joint decoding and Doppler filtering process using a conventional length-4 Hadamard transmitter code set. Some aspects of the conventional transmitting coding and decoding process are omitted from discussion of these figures (which were discussed above), for the sake of explanation.

FIG. 5A illustrates an example of a length-4 Hadamard coded chirp sequence for the case of 3 transmitters, Tx1, Tx2, and Tx3. Each box represents a chirp that has been coded according to a transmitter code chip, where the chirp waveforms coded with 0 degree phase shift are shown as filled-in boxes and the chirp waveforms coded with 180 degree phase shift are shown as clear boxes. The top row of boxes represents a first coded chirp sequence CCS for the first transmitter Tx1 (e.g., using $C_1$ of the Hadamard code), the middle row of boxes represents a second coded chirp sequence for the second transmitter Tx2 (e.g., using $C_2$ of the Hadamard code), and the bottom row of boxes represents a third coded chirp sequence for the third transmitter Tx3 (e.g., using $C_3$ of the Hadamard code). The three coded chirp sequences CCS(Tx1), CCS(Tx2), and CCS(Tx3) are transmitted simultaneously on the respective transmitter and each are repeated 32 times (or K=32), with a total of 128 chirps 302 for the entire dwell time. The PRI length is 4 chirps, resulting in 32 PRIs, where PRI 502 has a duration equal to 4*Tr.

The coded chirp sequences of Tx1, Tx2, and Tx3 are received on a receiver and are decoded by decoder 120 by cross-correlating the sequences with transmitter Tx1's transmitter code $C_1$. The cross-correlation results of the three coded chirp sequences are illustrated in FIG. 5B, respectively labeled as XCorr(Tx1,Tx1), XCorr(Tx2, Tx1), and XCorr(Tx3, Tx1). For each of the 4-chirp PRIs, one decoded output 504 is produced, resulting in 32 decoded outputs 504(1)-(32). Each box represents an output 504 having a normalized decoded magnitude, where the maximum normalized decoded magnitudes are shown as filled-in boxes and the minimum normalized decoded magnitudes are shown as clear boxes.

The 32 decoded outputs 504 are then passed through FFT filter bank of STMF 122 to produce the Doppler spectrum of K Doppler bins. The result of the filtering is illustrated in FIG. 5C, respectively labeled as FFT{XCorr(Tx1,Tx1)}, FFT{XCorr(Tx2, Tx1)}, and FFT{XCorr(Tx3, Tx1)}. Each box represents a spectral response having a normalized spectral magnitude, where the maximum normalized spectral magnitudes are shown as filled-in boxes and the minimum normalized spectral magnitudes are shown as clear boxes. In the example shown, zero Doppler shift is assumed, so the resulting spectrum shows a strongest spectral response at the zero Doppler bin 506(1) of transmitter Tx1's spectrum. It clearly shows the problem with the conventional coding scheme in which the maximum unambiguous Doppler shift is 1/(4*Tr) [Hz] due to the transmitter coding. Note that in this example, even when only 3 transmitters are encoded, a length-4 Hadamard code is used because of the limitation of the orthogonal code (length-3 Hadamard code does not exist).

Figure 6A:
FIGS. 6A, 6B, 6C, and 6D are graphical representations of a ranging waveform encoded according to an optimized code set and processed by an example joint transmitter decoding and Doppler filtering process, according to some embodiments of the present disclosure.
Figure 7A:
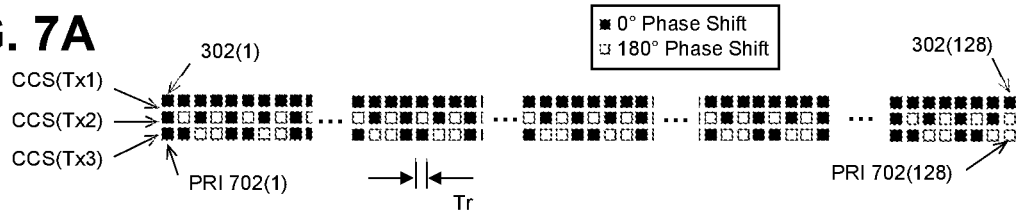
FIGS. 7A, 7B, and 7C are graphical representations of a ranging waveform encoded according to a Hadamard code set and processed by an example joint transmitter decoding and Doppler filtering process, according to some embodiments of the present disclosure.
Figure 7B:
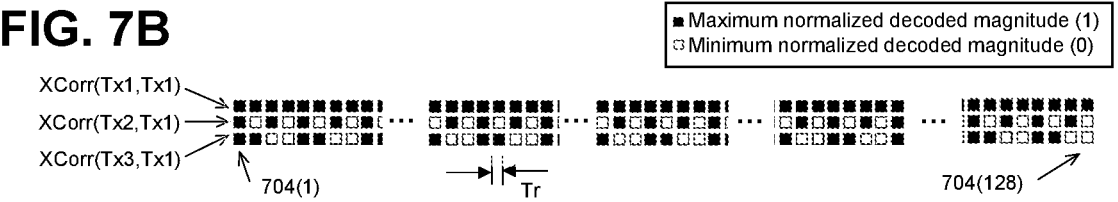
Figure 7C:
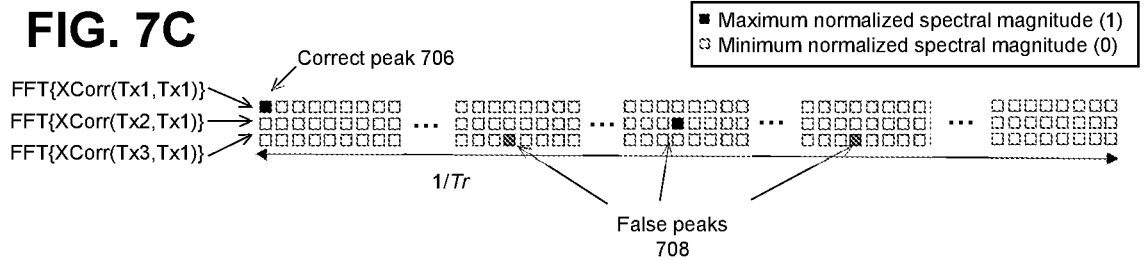

FIG. 6A illustrates an example of a length-K coded chirp sequence for the case of 3 transmitters. The example orthogonal BPSK transmitter code set OC having code length K=128 (as provided above under the heading Transmitter Coding) is used to code a K number of chirps for each transmitter. The top row of boxes represents a first optimized coded chirp sequence OCCS for the first transmitter Tx1 (e.g., using $OC_1$ of the optimized code set), the middle row of boxes represents a second optimized coded chirp sequence OCCS for the second transmitter Tx2 (e.g., using $OC_2$ of the optimized code set), and the bottom row of boxes represents a third optimized coded chirp sequence OCCS for the third transmitter Tx3 (e.g., using $OC_3$ of the optimized code set). The orthogonal code OC may be found by a number of ways, such as by random searching or by exhaustive search, based on the two optimization criteria provided above. No Doppler shift is assumed in this example. The three coded chirp sequences OCCS(Tx1), OCCS(Tx2), and OCCS(Tx3) are transmitted simultaneously on the respective transmitter, without need for repetition, with a total of 128 chirps filling the entire dwell time. The PRI length is one chirp, resulting in 128 PRIs, where PRI 602 has a duration equal to Tr.

Figure 6B:
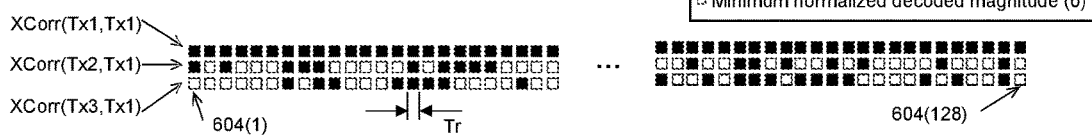

The sequences of Tx1, Tx2, and Tx3 are received on a receiver and are simultaneously decoded and Doppler filtered by the bank of combination filters of joint MF 220. An equivalent cross-correlation decode operation and Doppler filtering operation are shown in separate figures for the sake of explanation, even though they are performed simultaneously by joint MF 220. FIG. 6B illustrates the cross correlation of the sequences with transmitter Tx1's transmitter code $OC_1$, respectively labeled as XCorr(Tx1,Tx1), XCorr(Tx2, Tx1), and XCorr(Tx3, Tx1). A representative decoded output 604 is produced for each of the PRIs, resulting in 128 representative decoded outputs 604(1)-(128).

Figure 6C:
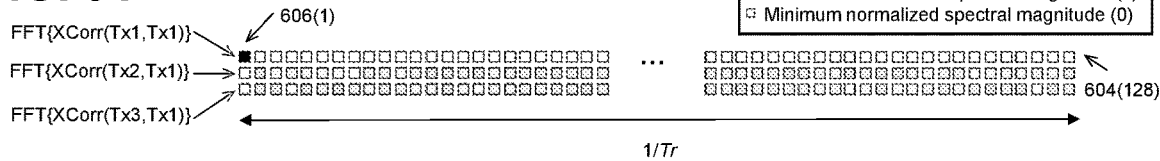
Figure 6D:
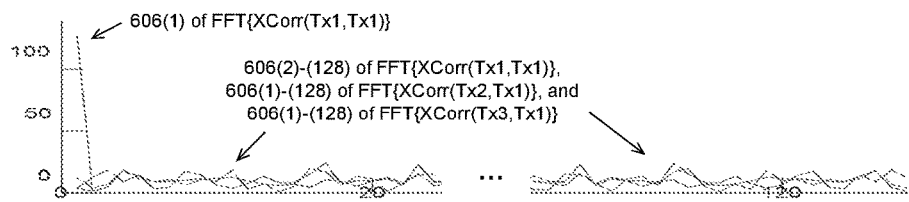

The cross correlation of Tx1's sequence with its own code results in a sequence of all 1's for XCorr (Tx1, Tx1), which result in a spectral peak at the zero Doppler bin 606(1) shown in FIG. 6C. The cross-correlation of Tx2's sequence with Tx1's code and the cross-correlation of Tx3's sequence with Tx1's code do not result in zero (as shown by the filled-in and clear boxes in FIG. 6B, indicating some code chips of the echo signal match code chips in the Tx2 and Tx3 codes), but they are also not periodic. The combination filters are also weighted using the complex conjugate of the transmitter code chips, resulting in spectral responses having normalized magnitudes less than the detection threshold for Tx2 and Tx3 in FIG. 6C. The maximum unambiguous Doppler shift is 1/Tr [Hz] due to the optimized transmitter coding. The cross-correlation periodicity is shown in the spectral analysis results illustrated in FIG. 6D, which shows low cross-correlation periodicity for the set of optimized codes OC. The spectral peak at the zero Doppler bin 606(1) can also be seen in FIG. 6D, while the spectral response of the other Doppler bins of the three sequences fall below the detection threshold, due to the spectral magnitudes being less than or equal to $\sqrt{K}$. No distinct sidelobes can be seen from the result. The average sidelobe level is also sufficiently low for resolving a largest-RCS (radar cross section) and a smallest-RCS target at the same range gate. Note that the dynamic range generally increases as the code length increases. In order to achieve higher dynamic range for the Doppler estimation, a longer code length can be used (but it is still subject to the coherent time). Additional process is required for further improving the dynamic range beyond what is allowed by the dwell time.

FIG. 7A illustrates an example of a set of orthogonal BPSK codes based on the length-4 Hadamard code, which is used to encode 128 chirps for the transmitter sequences labeled as CCS(Tx1), CCS(Tx2), and CCS(Tx3). FIG. 7B shows the equivalent cross-correlation of each sequence with Tx1's code with representative decoded outputs 704 (1)-(128), and FIG. 7C shows the corresponding spectral responses, with a spectral peak 706 correctly detected at the zero Doppler bin. As mentioned before, Hadamard code does not possess low periodicity in their cross correlation so it is not a suitable choice for the present disclosure. This can be seen in the Doppler spectrums of the cross correlations illustrated in FIG. 7C in which large distinct false Doppler peaks 708 are observed. Such strong false peaks are likely to result in false detections or shadow targets if no additional processing is attempted to mitigate the problem.

The circuitry described herein that implements radar system 200 may be implemented on a semiconductor substrate, which can be any semiconductor material or combinations of materials, such as gallium arsenide, silicon germanium, silicon-on-insulator (SOI), silicon, monocrystalline silicon, the like, and combinations of the above. The active circuitry for the radar system 200 on a die is formed using a sequence of numerous process steps applied to a semiconductor substrate, such as a semiconductor wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the active circuitry may be a combination of the integrated circuit components listed above or may be another type of microelectronic device. In some embodiments, the active circuitry includes an LDMOS (laterally diffused metal oxide semiconductor) transistor.

By now it should be appreciated that there has been provided an optimized transmitter coding scheme and optimized joint transmitter decoding and Doppler filtering scheme, which involves first choosing a set of transmitter codes that are orthogonal to each other and whose cross correlations are less periodic in nature and with a code length equal to the number of Doppler bins allowable by the dwell time; and secondly by complexly weighting the Doppler filters using the complex conjugates of the orthogonal codes as weights.

In one embodiment of the present disclosure, a radar system is provided, which includes: an N number of transmit antennas; a chirp generator configured to produce linear chirp waveforms; an N number of phase shift keying (PSK)

coders, each of the N PSK coders assigned a respective optimized transmitter code of a set of optimized transmitter codes, wherein each optimized transmitter code of the set includes a sequence of K code chips, each optimized transmitter code of the set is orthogonal to every other optimized transmitter code of the set, spectral analysis of a cross-correlation between any two optimized transmitter codes results in sidelobes having a value no greater than a predetermined detection threshold, each PSK coder is configured to encode a K number of linear chirp waveforms according to the sequence of K code chips of the respective optimized transmitter code and produce a respective optimized coded chirp sequence, and each of the N transmit antennas is configured to output the respective optimized coded chirp sequence at the same time.

One aspect of the above embodiment provides that the respective optimized coded chirp sequence is transmitted once to form a Doppler frame, and the sequence of K code chips used to code the respective optimized coded chirp sequence is never repeated during the Doppler frame.

A further aspect of the above embodiment provides that a pulse repetition interval (PRI) has a duration equal to or greater than a duration of the linear chirp waveforms, a K number of PRIs are completed during the Doppler frame, a Doppler measurement resolution of the radar system is $1/(K*PRI)$, and a maximum unambiguous Doppler shift measurable by the radar system is $+/-0.5*(1/PRI)$.

Another further aspect of the above embodiment provides that the Doppler frame is less than or equal to a dwell time, the dwell time is a maximum amount of time in which an echo signal is coherently processed by the radar system, and K is an integer number of Doppler bins that are allowable during the dwell time.

Another aspect of the above embodiment provides that the set of optimized transmitter codes includes a set of binary phase shift keying (BPSK) transmitter codes, and the predetermined detection threshold is less than or equal to $\sqrt{K}$.

Another aspect of the above embodiment provides that an M number of receive antennas configured to receive reflected optimized coded chirp sequences that were transmitted by one or more of the N transmit antennas and reflected off of a target, wherein each echo signal includes a particular optimized transmitter code used to encode the echo signal's original optimized coded chirp sequence; an M number of fast time matched filters (FTMF), each FTMF including a bank of J range gates configured to sort the echo signals into J range bins; and an M number of joint matched filters, each of the M joint matched filters implementing N*K combination filters for each of the J range bins, for a total of N*K*J combination filters, wherein each of the N*K*J combination filters is configured to simultaneously perform decoding and Doppler filtering of an echo signal.

A further aspect of the above embodiment provides that for each of the J range bins: the N*K combination filters are grouped into N groups, each N group having K combination filters, each of the N groups is associated with a distinct optimized transmitter code of the set of optimized transmitter codes, each of the K combination filters in a given group is tuned to a respective Doppler shift, and each of the K combination filters in the given group is weighted with a complex conjugate of a respective code chip of the distinct optimized transmitter code.

A still further aspect of the above embodiment provides that for each of the J range bins: for each of the N groups: each K combination filter is configured to multiply a respective code chip of a particular optimized transmitter code of a given echo signal by the complex conjugate of a respective code chip of the distinct optimized transmitter code, and each of the K combination filters is configured to output a correlation signal.

A still yet further aspect of the above embodiment provides that for each of the J range bins: for each of the N groups: a correlation peak is detected when a sum of the outputs of the K combination filters is greater than the predetermined detection threshold, and the correlation peak indicates that all code chips of the particular optimized transmitter code of the echo signal matches all code chips of the distinct optimized transmitter code.

Another further aspect of the above embodiment provides that the J range gates are implemented with either discrete Fast Fourier (DFT) filters or Fast Fourier transform (FFT) filters, and the N*K*J combination filters are implemented with Fast Fourier transform (FFT) filters.

In another embodiment of the present disclosure, a radar system is provided, which includes: an N number of transmit antennas; an M number of receive antennas configured to receive reflected optimized coded chirp sequences that were transmitted by one or more of the N transmit antennas and reflected off of a target, wherein each echo signal includes a particular optimized transmitter code used to encode the echo signal's original optimized coded chirp sequence; an M number of fast time matched filters (FTMF), each FTMF including a bank of J range gates configured to sort the echo signals into J range bins; and an M number of joint matched filters, each of the M joint matched filters implementing N*K combination filters for each of the J range bins, for a total of N*K*J combination filters, wherein each of the N*K*J combination filters is configured to simultaneously perform decoding and Doppler filtering of an echo signal.

One aspect of the above embodiment provides that each of the N transmit antennas is assigned a respective optimized transmitter code of a set of optimized transmitter codes, each optimized transmitter code of the set includes a sequence of K code chips, each optimized transmitter code of the set is orthogonal to every other optimized transmitter code of the set, and spectral analysis of a cross-correlation between any two optimized transmitter codes results in sidelobes having a value no greater than a predetermined detection threshold.

A further aspect of the above embodiment provides that for each of the J range bins: the N*K combination filters are grouped into N groups, each N group having K combination filters, each of the N groups is associated with a distinct optimized transmitter code of the set of optimized transmitter codes, each of the K combination filters in a given group is tuned to a respective Doppler shift, and each of the K combination filters in the given group is weighted with a complex conjugate of a respective code chip of the distinct optimized transmitter code.

A still further aspect of the above embodiment provides that for each of the J range bins: for each of the N groups: each K combination filter is configured to multiply a respective code chip of a particular optimized transmitter code of a given echo signal by the complex conjugate of a respective code chip of the distinct optimized transmitter code, and each of the K combination filters is configured to output a correlation signal.

A still yet further aspect of the above embodiment provides that for each of the J range bins: for each of the N groups: a correlation peak is detected when a sum of the outputs of the K combination filters is greater than the predetermined detection threshold, and the correlation peak indicates that all code chips of the particular optimized transmitter code of the echo signal matches all code chips of the distinct optimized transmitter code.

Another aspect of the above embodiment provides that the J range gates are implemented with either discrete Fast Fourier (DFT) filters or Fast Fourier transform (FFT) filters, and the N*K*J combination filters are implemented with Fast Fourier transform (FFT) filters.

Another aspect of the above embodiment provides that the radar system further includes: a chirp generator configured to produce linear chirp waveforms; an N number of phase shift keying (PSK) coders, each of the N PSK coders assigned a respective optimized transmitter code of a set of optimized transmitter codes, wherein each optimized transmitter code of the set includes a sequence of K code chips, each optimized transmitter code of the set is orthogonal to every other optimized transmitter code of the set, spectral analysis of a cross-correlation between any two optimized transmitter codes results in sidelobes having a value no greater than a predetermined detection threshold, each PSK coder is configured to encode a K number of linear chirp waveforms according to the sequence of K code chips of the respective optimized transmitter code and produce a respective optimized coded chirp sequence, and each of the N transmit antennas is configured to output the respective optimized coded chirp sequence at the same time.

A further aspect of the above embodiment provides that the respective optimized coded chirp sequence is transmitted once to form a Doppler frame, and the sequence of K code chips used to code the respective optimized coded chirp sequence is never repeated during the Doppler frame.

A still further aspect of the above embodiment provides that a pulse repetition interval (PRI) has a duration equal to or greater than a duration of the linear chirp waveforms, a K number of PRIs are completed during the Doppler frame, a Doppler measurement resolution of the radar system is $1/(K*PRI)$, and a maximum unambiguous Doppler shift measurable by the radar system is $+/-0.5*(1/PRI)$.

Another still further aspect of the above embodiment provides that the Doppler frame is less than or equal to a dwell time, the dwell time is a maximum amount of time in which an echo signal is coherently processed by the radar system, and K is an integer number of Doppler bins that are allowable during the dwell time.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the terms "substantial" and "substantially" mean sufficient to achieve the stated purpose or value in a practical manner, taking into account any minor imperfections or deviations, if any, that arise from usual and expected process abnormalities that may occur during wafer fabrication, which are not significant for the stated purpose or value. Also as used herein, the terms "approximately" or "approximating" mean a value close to or within an acceptable range of an indicated value, amount, or quality, which also includes the exact indicated value itself.

Although the invention is described herein with reference to specific embodiments, various modifications and changes can be made without departing from the scope of the present invention as set forth in the claims below. For example, additional or fewer transmitters and receivers may be implemented in the radar system of FIG. 2. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radar system comprising:
  an N number of transmit antennas; and
  an N number of phase shift keying (PSK) coders, each of the N PSK coders assigned a respective optimized transmitter code of a set of optimized transmitter codes, wherein
    each optimized transmitter code of the set comprises a sequence of K code chips,
    each optimized transmitter code of the set is orthogonal to every other optimized transmitter code of the set,
    spectral analysis of a cross-correlation between any two optimized transmitter codes results in sidelobes having a value no greater than a predetermined detection threshold,
    each PSK coder is configured to encode a K number of ranging waveform blocks according to the sequence of K code chips of the respective optimized transmitter code and produce a respective optimized coded sequence, and
    each of the N transmit antennas is configured to output the respective optimized coded sequence at the same time.

2. The radar system of claim 1, wherein
  the respective optimized coded sequence is transmitted once to form a Doppler frame, and
  the sequence of K code chips used to code the respective optimized coded sequence is never repeated during the Doppler frame.

3. The radar system of claim 2, wherein
  a pulse repetition interval (PRI) has a duration equal to or greater than a duration of the ranging waveform block,
  a K number of PRIs are completed during the Doppler frame, a Doppler measurement resolution of the radar system is 1/(K*PRI), and a maximum unambiguous Doppler shift measurable by the radar system is +/−0.5*(1/PRI).

4. The radar system of claim 2, wherein
the Doppler frame is less than or equal to a dwell time,
the dwell time is a maximum amount of time in which an echo signal is coherently processed by the radar system, and
K is an integer number of Doppler bins that are allowable during the dwell time.

5. The radar system of claim 1, wherein
the set of optimized transmitter codes comprises a set of binary phase shift keying (BPSK) transmitter codes, and
the predetermined detection threshold is less than or equal to $\sqrt{K}$.

6. The radar system of claim 1, further comprising:
an M number of receive antennas configured to receive reflected optimized coded sequences that were transmitted by one or more of the N transmit antennas and reflected off of a target, wherein
each echo signal's original optimized coded sequence comprises a sequence of K ranging waveform blocks that are encoded according to a sequence of K code chips of a particular optimized transmitter code, each ranging waveform block comprising an L number of unit ranging waveforms;
an M number of fast time matched filters (FTMF), each FTMF comprising a bank of J range gates, each J range gate comprising L filters, each J range gate tuned to a respective range, wherein the J range gates are configured to sort the echo signals into J range bins;
an M number of summer blocks, each summer block configured to sum a set of J*L outputs into J range gate outputs; and
an M number of joint matched filters, each of the M joint matched filters implementing N*K combination filters for each of the J range gate outputs, for a total of N*K*J combination filters, wherein
each of the N*K*J combination filters is configured to simultaneously perform decoding and Doppler filtering of an echo signal.

7. The radar system of claim 6, wherein
for each of the J range gate outputs:
the N*K combination filters are grouped into N groups, each N group having K combination filters,
each of the N groups is associated with a distinct optimized transmitter code of the set of optimized transmitter codes,
each of the K combination filters in a given group is tuned to a respective Doppler shift, and
each of the K combination filters in the given group is weighted with a complex conjugate of a respective code chip of the distinct optimized transmitter code.

8. The radar system of claim 7, wherein
for each of the J range gate outputs:
for each of the N groups:
each K combination filter is configured to multiply a respective code chip of a particular optimized transmitter code of a given echo signal by the complex conjugate of a respective code chip of the distinct optimized transmitter code, and
each of the K combination filters is configured to output a correlation signal.

9. The radar system of claim 8, wherein
for each of the J range gate outputs:
for each of the N groups:
a correlation peak is detected when a sum of the outputs of the K combination filters is greater than the predetermined detection threshold, and
the correlation peak indicates that all code chips of the particular optimized transmitter code of the echo signal matches all code chips of the distinct optimized transmitter code.

10. The radar system of claim 6, wherein
the N*K*J combination filters are implemented with Fast Fourier transform (FFT) filters.

11. A radar system comprising:
an N number of transmit antennas;
an M number of receive antennas configured to receive reflected optimized coded sequences that were transmitted by one or more of the N transmit antennas and reflected off of a target, wherein
each echo signal's original optimized coded sequence comprises a sequence of K ranging waveform blocks that are encoded according to a sequence of K code chips of a particular optimized transmitter code, each ranging waveform block comprising an L number of unit ranging waveforms;
an M number of fast time matched filters (FTMF), each FTMF comprising a bank of J range gates, each J range gate comprising L filters, each J range gate tuned to a respective range, wherein the J range gates are configured to sort the echo signals into J range bins;
an M number of summer blocks, each summer block configured to sum a set of J*L outputs into J range gate outputs; and
an M number of joint matched filters, each of the M joint matched filters implementing N*K combination filters for each of the J range gate outputs, for a total of N*K*J combination filters, wherein
each of the N*K*J combination filters is configured to simultaneously perform decoding and Doppler filtering of an echo signal.

12. The radar system of claim 11, wherein
each of the N transmit antennas is assigned a respective optimized transmitter code of a set of optimized transmitter codes,
each optimized transmitter code of the set comprises a sequence of K code chips,
each optimized transmitter code of the set is orthogonal to every other optimized transmitter code of the set, and
spectral analysis of a cross-correlation between any two optimized transmitter codes results in sidelobes having a value no greater than a predetermined detection threshold.

13. The radar system of claim 12, wherein
for each of the J range gate outputs:
the N*K combination filters are grouped into N groups, each N group having K combination filters,
each of the N groups is associated with a distinct optimized transmitter code of the set of optimized transmitter codes,
each of the K combination filters in a given group is tuned to a respective Doppler shift, and
each of the K combination filters in the given group is weighted with a complex conjugate of a respective code chip of the distinct optimized transmitter code.

14. The radar system of claim 13, wherein
for each of the J range gate outputs:
for each of the N groups:
each K combination filter is configured to multiply a respective code chip of a particular optimized transmitter code of a given echo signal by the complex conjugate of a respective code chip of the distinct optimized transmitter code, and each of the K combination filters is configured to output a correlation signal.

15. The radar system of claim 14, wherein
for each of the J range gate outputs:
for each of the N groups:
a correlation peak is detected when a sum of the outputs of the K combination filters is greater than the predetermined detection threshold, and
the correlation peak indicates that all code chips of the particular optimized transmitter code of the echo signal matches all code chips of the distinct optimized transmitter code.

16. The radar system of claim 11, wherein
the N*K*J combination filters are implemented with Fast Fourier transform (FFT) filters.

17. The radar system of claim 12, further comprising:
a waveform generator configured to produce unit ranging waveforms;
a waveform concatenator configured to concatenate an L number of unit ranging waveforms to form a ranging waveform block; and
an N number of phase shift keying (PSK) coders, each of the N PSK coders assigned the respective optimized transmitter code of the set of optimized transmitter codes and configured to encode a K number of ranging waveform blocks according to the respective optimized transmitter code to form a respective optimized coded sequence.

18. The radar system of claim 17, wherein
the respective optimized transmitter code is a first respective optimized transmitter code,
the set of optimized transmitter codes is a first set of optimized transmitter codes,
each of the N PSK coders are further assigned a second respective optimized transmitter code from a second set of optimized transmitter codes having code length K,
each of the N PSK coders configured to encode a K number of ranging waveform blocks according to the second respective optimized transmitter code to form a second respective optimized coded sequence,
a first spectral analysis of a first cross-correlation between any of the first set of optimized transmitter codes with the first respective optimized transmitter code are coherently summed with a second spectral analysis of a second cross-correlation between any of the second set of optimized transmitter codes with the second respective optimized transmitter code to result in an integrated spectral analysis, wherein
any peaks that correspond to consistent Doppler bins across both the first and second spectral analyses are summed constructively to produce a correct peak in the integrated spectral analysis,
any false peaks that correspond to inconsistent Doppler bins across the first and second spectral analyses are suppressed.

19. A radar system comprising:
an N number of transmit antennas;
a waveform generator configured to produce unit ranging waveforms;
a waveform concatenator configured to concatenate an L number of unit ranging waveforms to form a ranging waveform block; and
an N number of phase shift keying (PSK) coders, wherein
each of the N PSK coders are assigned a first respective non-optimized transmitter code from a first set of non-optimized transmitter codes having a code length less than K,
each of the N PSK coders are configured to repeat the first respective non-optimized transmitter code to encode a K number of ranging waveform blocks to form a first respective non-optimized coded sequence,
each of the N PSK coders are further assigned a second respective non-optimized transmitter code from a second set of non-optimized transmitter codes having a code length less than K,
each of the N PSK coders are configured to repeat the second respective non-optimized transmitter code to encode a K number of ranging waveform blocks to form a second respective non-optimized coded sequence,
a first spectral analysis of a cross-correlation between any of the first set of non-optimized transmitter codes with the first respective non-optimized transmitter code results in a first plurality of peaks,
a second spectral analysis of a cross-correlation between any of the second set of non-optimized transmitter codes with the second respective non-optimized transmitter code results in a second plurality of peaks,
a spectral tracking algorithm indicates that any peaks that correspond to consistent Doppler bins across the first and second spectral analyses indicate a correct peak, and
any peaks that correspond to inconsistent Doppler bins across the first and second spectral analyses are suppressed.

20. The radar system of claim 19, wherein
a Doppler filter on a receiver that receives echo signals of non-optimized coded sequences has a filter length of K samples,
the first and second sets of non-optimized transmitter codes are Hadamard codes,
the non-optimized transmitter codes in the first set each have a first code length, and
the non-optimized transmitter codes in the second set each have a second code length that is twice as long as the first code length.

* * * * *